US011353628B2

(12) United States Patent
Byun et al.

(10) Patent No.: US 11,353,628 B2
(45) Date of Patent: *Jun. 7, 2022

(54) ANTI-REFLECTIVE FILM

(71) Applicant: LG CHEM, LTD., Seoul (KR)

(72) Inventors: Jin Seok Byun, Daejeon (KR); Jae Young Kim, Daejeon (KR); Yeong Rae Chang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/311,447

(22) PCT Filed: Mar. 30, 2018

(86) PCT No.: PCT/KR2018/003809
§ 371 (c)(1),
(2) Date: Dec. 19, 2018

(87) PCT Pub. No.: WO2018/199487
PCT Pub. Date: Nov. 1, 2018

(65) Prior Publication Data
US 2019/0113658 A1 Apr. 18, 2019

(30) Foreign Application Priority Data
Apr. 28, 2017 (KR) .................. 10-2017-0055672

(51) Int. Cl.
| G02B 1/111 | (2015.01) |
| G02B 1/14 | (2015.01) |
| C09D 5/00 | (2006.01) |
| C09D 7/40 | (2018.01) |
| C09D 4/06 | (2006.01) |
| C08K 7/26 | (2006.01) |
| C08K 3/36 | (2006.01) |
| C09D 4/00 | (2006.01) |
| C09D 135/02 | (2006.01) |
| G02B 1/12 | (2006.01) |
| G02B 1/11 | (2015.01) |

(52) U.S. Cl.
CPC .............. *G02B 1/111* (2013.01); *C09D 4/00* (2013.01); *C09D 4/06* (2013.01); *C09D 5/006* (2013.01); *C09D 7/67* (2018.01); *C09D 7/70* (2018.01); *C09D 135/02* (2013.01); *G02B 1/11* (2013.01); *G02B 1/12* (2013.01); *G02B 1/14* (2015.01); *C08K 3/36* (2013.01); *C08K 7/26* (2013.01); *C08K 2201/003* (2013.01); *C08K 2201/014* (2013.01)

(58) Field of Classification Search
CPC .... G02B 1/111; G02B 2207/107; G02B 1/14; G02B 1/11; C08K 7/24; C08K 7/26; C08K 7/22; C08K 7/28; C08K 2201/003; C08K 2201/014; C09D 7/67
See application file for complete search history.

(56) References Cited

U.S. PATENT DOCUMENTS

| 6,447,712 | B1 | 9/2002 | Dogan et al. | |
| 10,222,510 | B2* | 3/2019 | Song | C09D 5/004 |
| 10,234,599 | B2* | 3/2019 | Byun | C08J 5/18 |
| 10,983,252 | B2* | 4/2021 | Song | B32B 7/023 |
| 2004/0070041 | A1* | 4/2004 | Obayashi | B29C 55/045 |
| | | | | 257/437 |
| 2004/0114248 | A1 | 6/2004 | Hokazono et al. | |
| 2006/0164104 | A1 | 7/2006 | Tada et al. | |
| 2006/0188664 | A1* | 8/2006 | Ando | C09D 183/04 |
| | | | | 428/1.1 |
| 2007/0022798 | A1 | 2/2007 | Morinaga et al. | |
| 2007/0121211 | A1 | 5/2007 | Watanabe et al. | |
| 2007/0146887 | A1 | 6/2007 | Ikeda et al. | |
| 2008/0032053 | A1 | 2/2008 | Kourtakis et al. | |
| 2009/0202819 | A1* | 8/2009 | Asahi | G02B 1/111 |
| | | | | 428/336 |
| 2009/0246415 | A1 | 10/2009 | Horie et al. | |
| 2010/0002297 | A1* | 1/2010 | Shibuya | B29C 41/28 |
| | | | | 359/485.01 |
| 2010/0021694 | A1 | 1/2010 | Wakizaka et al. | |
| 2010/0067109 | A1 | 3/2010 | Horio et al. | |
| 2011/0080645 | A1* | 4/2011 | Tsuno | G02B 5/0242 |
| | | | | 359/599 |
| 2012/0162774 | A1 | 6/2012 | Ishida et al. | |

(Continued)

FOREIGN PATENT DOCUMENTS

| CN | 1806158 A | 7/2006 |
| CN | 101223025 A | 7/2008 |

(Continued)

OTHER PUBLICATIONS

FP-2260 Friction/Peel Tester Brochure, Thwing-Albert Instrument Company, retrieved from www.thwingalbert.com on Mar. 18, 2019. (Year: 2019).*
ASTM G115-10, Standard Guide for Measuring and Reporting Friction Coefficients, Jul. 2018, ASTM International. (Year: 2018).*
ASTM D1894-14, Standard Test Method for Static and Kinetic Coefficients of Friction of Plastic Film and Sheeting, Mar. 2014, ASTM International. (Year: 2014).*
Liguori, A Statistical Approach for Improving the Accuracy of Dry Friction Coefficient Measurement, 2019, IEEE Transactions on Instrumentation and Measurement, vol. 68, No. 5, pp. 1412-1423. (Year: 2019).*
International Search Report and Written Opinion issued for International Application No. PCT/KR2018/003809 dated Jul. 12, 2018, 13 pages.

(Continued)

*Primary Examiner* — Monique R Jackson
(74) *Attorney, Agent, or Firm* — Rothwell, Figg, Ernst & Manbeck, P.C.

(57) ABSTRACT

The present invention relates to an anti-reflective film including: a hard coating layer; and a low refractive index layer including a binder resin, and hollow inorganic nanoparticles and solid inorganic nanoparticles which are dispersed in the binder resin, wherein in a graph of the measurement of the friction force with a TAC film measured by applying a load of 400 g to the surface, the maximum amplitude (A) is 0.1 or less based on the average friction force.

15 Claims, 8 Drawing Sheets

(56) References Cited

U.S. PATENT DOCUMENTS

| | | | |
|---|---|---|---|
| 2012/0200933 A1* | 8/2012 | Akiyama | G02B 5/0242 359/601 |
| 2013/0078440 A1 | 3/2013 | Kim et al. | |
| 2013/0084442 A1 | 4/2013 | Akutagawa et al. | |
| 2013/0216818 A1 | 8/2013 | Kim et al. | |
| 2013/0216819 A1 | 8/2013 | Kim et al. | |
| 2013/0329297 A1* | 12/2013 | Hayashi | G02F 1/133502 359/601 |
| 2015/0322270 A1 | 11/2015 | Amin et al. | |
| 2016/0266293 A1 | 9/2016 | Hong et al. | |
| 2016/0304722 A1* | 10/2016 | Kobori | C09D 4/00 |
| 2017/0131439 A1 | 5/2017 | Kobori et al. | |
| 2018/0017713 A1 | 1/2018 | Byun et al. | |
| 2018/0265710 A1* | 9/2018 | Byun | G03F 7/0047 |
| 2019/0113658 A1 | 4/2019 | Byun et al. | |

FOREIGN PATENT DOCUMENTS

| | | | | | |
|---|---|---|---|---|---|
| JP | 2001-233611 A | | 8/2001 | | |
| JP | 2003-054996 A | | 2/2003 | | |
| JP | 2004-043214 A | | 2/2004 | | |
| JP | 2005-082762 A | | 3/2005 | | |
| JP | 2005082762 A | * | 3/2005 | | |
| JP | 2006-251665 A | | 9/2006 | | |
| JP | 2007-163754 A | | 6/2007 | | |
| JP | 2007-219485 A | | 8/2007 | | |
| JP | 2007-272132 A | | 10/2007 | | |
| JP | 2007-293313 A | | 11/2007 | | |
| JP | 2008058348 A | * | 3/2008 | | |
| JP | 2008069267 A | * | 3/2008 | | |
| JP | 2008096701 A | * | 4/2008 | | |
| JP | 2009-217258 A | | 9/2009 | | |
| JP | 2009-244382 A | | 10/2009 | | |
| JP | 2009-276738 A | | 11/2009 | | |
| JP | 2010-085983 A | | 4/2010 | | |
| JP | 2010-277059 A | | 12/2010 | | |
| JP | 2011-088787 A | | 5/2011 | | |
| JP | 4854098 B1 | | 1/2012 | | |
| JP | 2013-178534 A | | 9/2013 | | |
| JP | 2013-228741 A | | 11/2013 | | |
| JP | 2014095890 A | * | 5/2014 | | G02B 1/111 |
| JP | 2014-525598 A | | 9/2014 | | |
| JP | 2014-529762 A | | 11/2014 | | |
| JP | 2014-534289 A | | 12/2014 | | |
| JP | 2015-004937 A | | 1/2015 | | |
| JP | 2015-232614 A | | 12/2015 | | |
| JP | 2016-155992 A | | 9/2016 | | |
| JP | 2016-194720 A | | 11/2016 | | |
| KR | 10-2006-0111622 A | | 10/2006 | | |
| KR | 10-2009-0046873 A | | 5/2009 | | |
| KR | 10-2012-0067990 A | | 6/2012 | | |
| KR | 10-2012-0093212 A | | 8/2012 | | |
| KR | 10-1189196 B1 | | 10/2012 | | |
| KR | 10-2014-0006876 A | | 1/2014 | | |
| KR | 10-2014-0006922 A | | 1/2014 | | |
| KR | 20140006922 A | * | 1/2014 | | G02B 1/11 |
| KR | 10-1548313 B1 | | 8/2015 | | |
| KR | 10-1692109 B1 | | 1/2017 | | |
| KR | 10-2018-0121229 A | | 11/2018 | | |
| WO | 2012-147527 A1 | | 11/2012 | | |
| WO | 2012-157682 A1 | | 11/2012 | | |
| WO | 2013-099931 A1 | | 7/2013 | | |

OTHER PUBLICATIONS

Extended European Search Report issued for European Patent Application No. 18790054.3 dated Jan. 15, 2020, 9 pages.

Mizumoto et al., "Correlation between Positioning Accuracy and Fluctuation of Frictional Force in Slide Way", Seimitsu Kikai, 1978, vol. 44, Issue 6, pp. 653-695, retrieved from: https://www.jstage.jst.go.jp/article/jspe1933/44/522/44_522_653/_pdf.

* cited by examiner

[FIG. 1]
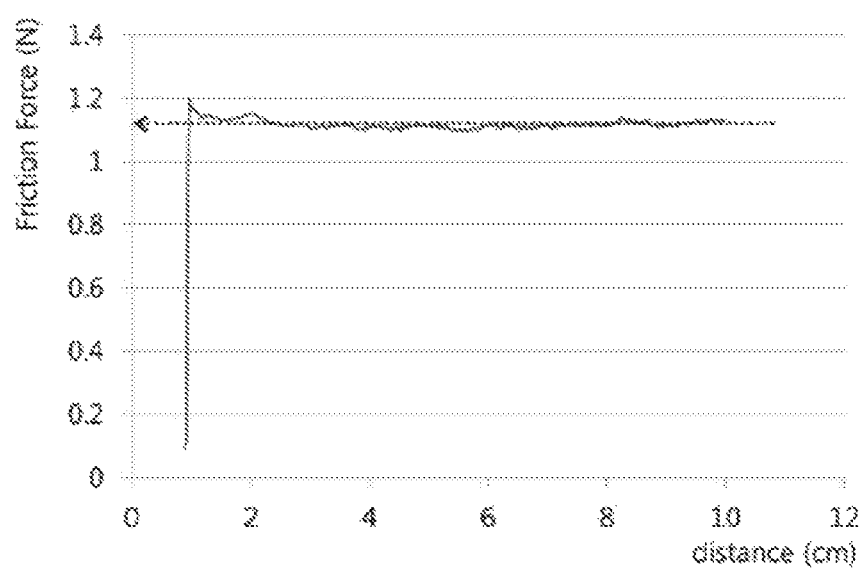

[FIG. 2]
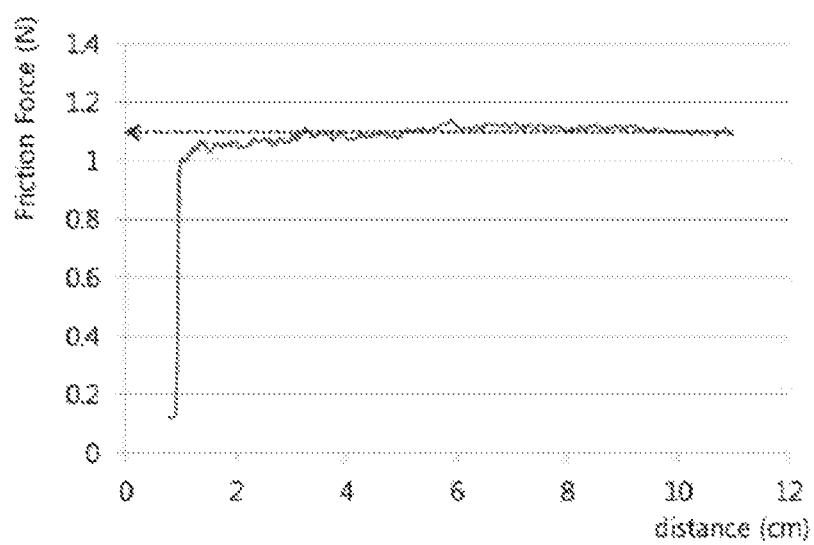

[FIG. 3]
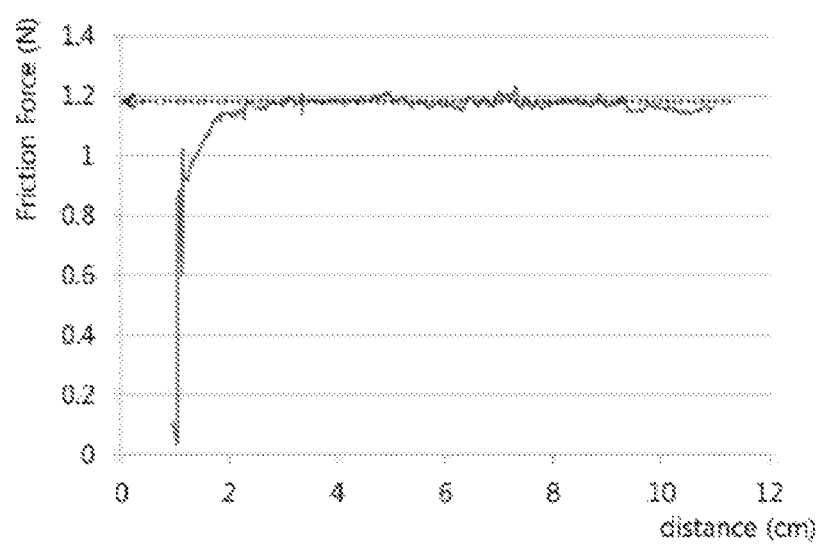

[FIG. 4]
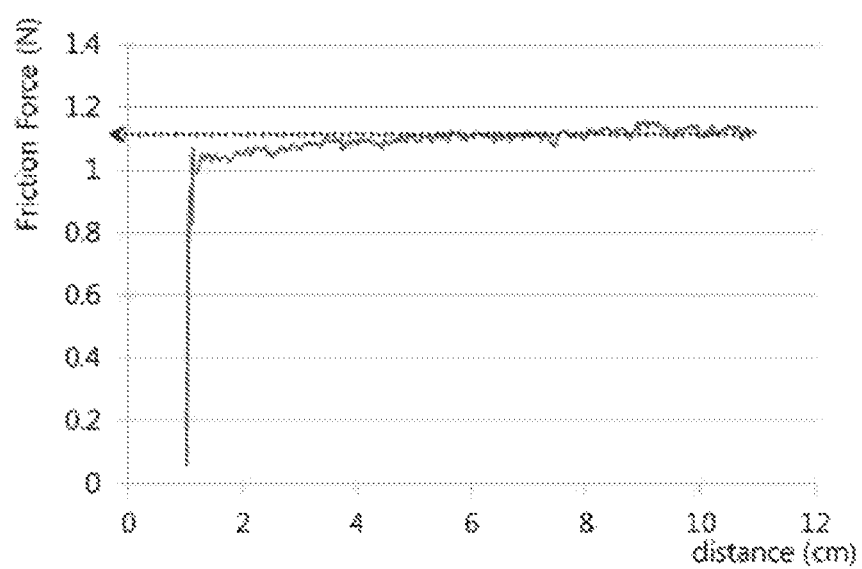

【FIG. 5】
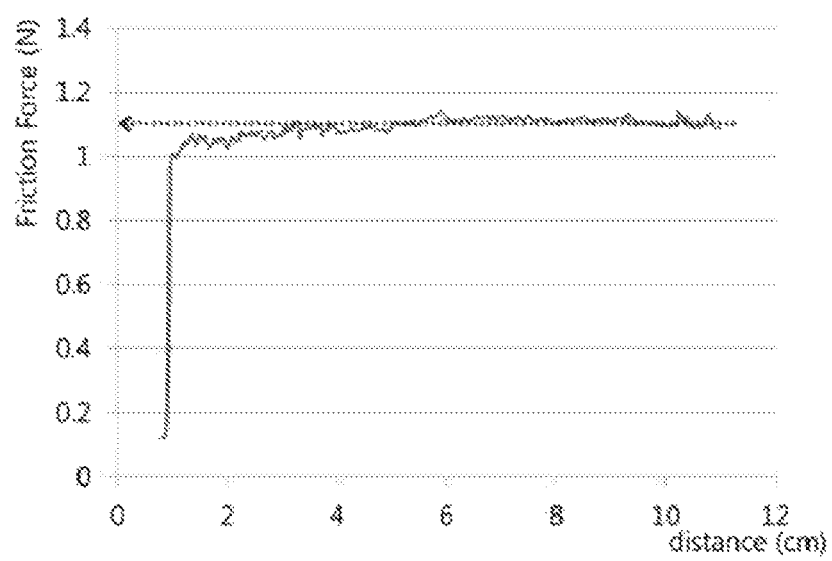

[FIG. 6]
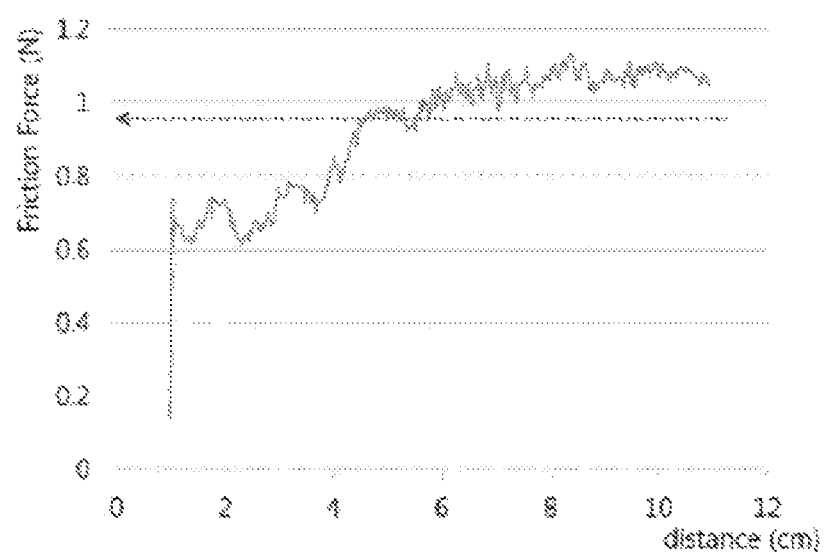

[FIG. 7]
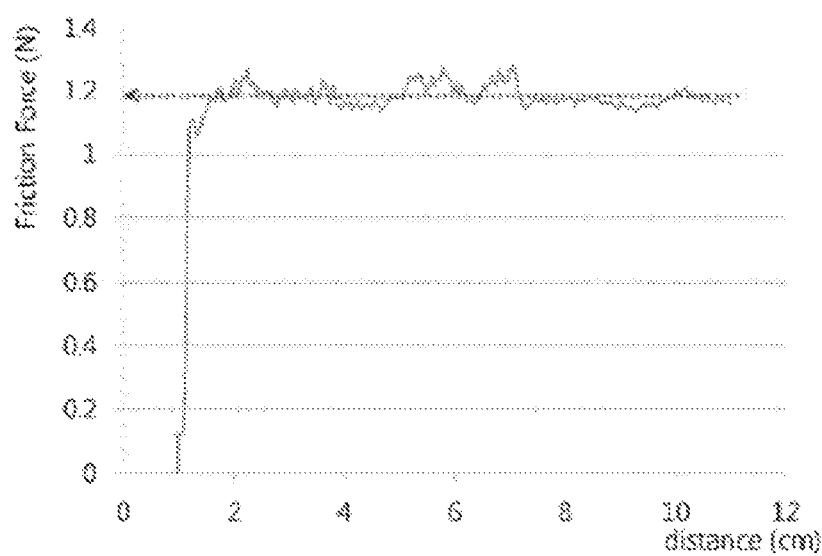

[FIG. 8]
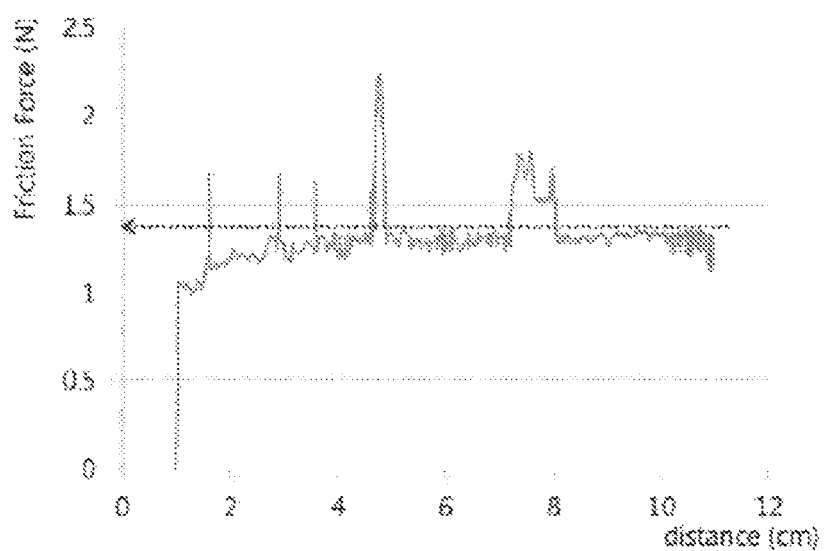

ANTI-REFLECTIVE FILM

CROSS-REFERENCE TO RELATED APPLICATION(S)

This application is a 35 U.S.C. § 371 National Phase Entry Application from PCT/KR2018/003809, filed on Mar. 30, 2018, and designating the United States, which claims the benefit of priority from Korean Patent Application No. 10-2017-0055672 filed on Apr. 28, 2017 with the Korean Intellectual Property Office, the full disclosure of which are incorporated

FIELD OF THE INVENTION

The present invention relates to an anti-reflective film. More specifically, the present invention relates to an anti-reflective film that is capable of simultaneously realizing high scratch resistance and antifouling property while having low reflectance and high light transmittance, and that is further capable of enhancing screen sharpness of a display device.

BACKGROUND OF THE INVENTION

In general, a flat panel display device such as a plasma display panel (PDP) or a liquid crystal display (LCD) is equipped with an anti-reflective film for minimizing the reflection of incident light from the outside.

As a method for minimizing the reflection of light, a method (anti-glare: AG coating) in which a filler such as a inorganic fine particle is dispersed in a resin and coated onto a substrate film to impart irregularities, a method (anti-reflection: AR coating) of using interference of light by forming a plurality of layers having different refractive indexes on a substrate film, a method for mixing them, etc., exist.

Among them, in the case of the AG coating, the absolute amount of the reflected light is equivalent to that of general hard coating, but a low reflection effect can be obtained by reducing the amount of light entering the eye using light scattering through irregularities.

However, since the AG coating has poor screen sharpness due to the surface irregularities, many studies on AR coating have been recently conducted.

As for a film using the AR coating, a multi-layer structure in which a hard coating layer (high refractive index layer), a low reflective coating layer, and the like are laminated on a substrate film has been commercialized.

However, the method of forming a plurality of layers as described above has disadvantages in that, as the process for forming each layer is performed separately, the interlayer adhesion force (interfacial adhesion) is weak, and thus the scratch resistance is lowered and the manufacturing cost is increased by a repetitive process.

In addition, conventionally, in order to improve the scratch resistance of the low refractive index layer included in the anti-reflective film, a method of adding various particles with a size of nanometers (for example, particles of silica, alumina, zeolite, etc.) had been mainly attempted.

However, when the nanometer-sized particles were used as described above, there was a limitation in simultaneously increasing the scratch resistance while lowering the reflectance of the low refractive index layer, and the antifouling property of the surface of the low refractive index layer was greatly reduced due to the nanometer-sized particles.

Accordingly, many studies have been actively conducted to reduce the absolute reflection amount of light incident from the outside and to improve the antifouling property together with the scratch resistance, but the degree of improvement in physical properties resulting therefrom is insufficient.

SUMMARY OF THE INVENTION

Technical Problem

It is one object of the present invention to provide an anti-reflective film that is capable of simultaneously realizing high scratch resistance and antifouling properties while having low reflectance and high light transmittance, and that is further capable of enhancing screen sharpness of a display device.

Technical Solution

In one embodiment of the present invention, an anti-reflective film including: a hard coating layer; and a low refractive index layer including a binder resin, and hollow inorganic nanoparticles and solid inorganic nanoparticles which are dispersed in the binder resin, is provided, wherein in a graph of measurement of friction force with a TAC (triacetyl cellulose) film measured by applying a load of 400 g to the surface, the maximum amplitude (A) is 0.1 N or less based on the average friction force.

Hereinafter, the anti-reflective film according to specific embodiments of the present invention will be described in more detail.

In the present disclosure, the photopolymerizable compound collectively refers to a compound which causes a polymerization reaction when irradiated with light, for example, when irradiated with visible light or ultraviolet light.

Further, the fluorine-containing compound refers to a compound containing at least one fluorine element in the compound.

In addition, the (meth)acryl refers to including both acryl and methacryl.

Moreover, the (co)polymer refers to including both a co-polymer and a homo-polymer.

Furthermore, the hollow silica particles refer to silica particles derived from a silicon compound or an organosilicon compound, in which an empty space is present on the surface and/or inside of the silica particles.

According to one embodiment of the present invention, an anti-reflective film may be provided, including: a hard coating layer; and a low refractive index layer including a binder resin, and hollow inorganic nanoparticles and solid inorganic nanoparticles which are dispersed in the binder resin, wherein in the graph of the measurement of the friction force with a TAC film measured by applying a load of 400 g to the surface, the maximum amplitude (A) is 0.1 N or less based on the average friction force.

Herein, the maximum amplitude (A) refers to a maximum value of the difference in absolute values between an average friction force and a maximum friction force and between an average friction force and a minimum friction force, after determining the average friction force, the maximum friction force, and the minimum friction force in a dynamic test distance section on the graph of the friction force measurement.

For the low refractive index layer, in order to realize a low refractive index, hollow inorganic nanoparticles having a low refractive index can be usually added in a large amount.

However, increasing the amount of the hollow inorganic nanoparticles leads to a problem that the mechanical properties such as scratch resistance and antifouling property are lowered.

In this regard, the present inventors conducted extensive and intensive studies on the surface friction force of the film in order to derive a low refractive index layer constitution simultaneously exhibiting the excellent scratch resistance and antifouling property while lowering the reflectance of the low refraction layer. As a result, the inventors found through experiments that by determining the slip property of the surface of the anti-reflective film through the maximum amplitude (A) parameter in the graph of the measurement of friction force with a TAC film on the surface of the anti-reflective film, it is easy to grasp the scratch resistance and antifouling properties of the film, thereby completing the present invention.

The graph of the friction force measurement of the anti-reflective film can be obtained by bringing a TAC film into contact with the film surface, placing a sled with a load of 400 g thereon, and then measuring the friction force while moving the sled at a certain test speed by a specified distance.

In this case, the graph of the friction force measurement is obtained as a friction force (y-axis) with respect to the test distance (x-axis), and the test distance is divided into a static test distance section and a kinetic test distance section.

Herein, the static test distance is a section for measuring a static friction force, and the static friction force is defined as a friction force measured at a distance of up to 3 cm after the start of the measurement.

Further, the kinetic test distance is a section for measuring the kinetic friction force, and is measured as an average value of the friction force measured in the section in which a sled is moved, specifically, the friction force measured in the kinetic test distance section.

The maximum amplitude (A) used herein is measured in the kinetic test distance among the test distances, and refers to a maximum value of the difference absolute values between an average friction force and a maximum friction force or a minimum friction force, after obtaining the average friction force, the maximum friction force, and the minimum friction force in a dynamic test distance section.

Therefore, the parameter on the maximum amplitude (A) is not measured from the starting point of the test distance, but is measured by the difference between the average friction force and the maximum friction force or the minimum friction force at the dynamic test distance, which can function as a measure to judge the slip property of the surface of the anti-reflective film.

For example, the graph of the friction force measurement of the anti-reflective film according to one embodiment can be obtained by bringing a TAC film into contact with a surface of the anti-reflective film using a Friction Tester (FP-2260, manufactured by Thwing-Albert Instrument Company), placing a sled with a load of 400 g thereon, and then measuring the friction force while pulling the sled at a test speed of 18 cm/min by a test distance of 10 cm in total.

In this case, the static test distance among the total test distance is a section of up to 3 cm in the test distance, and the dynamic test distance corresponds to a section from 3 cm to 10 cm in the test distance.

Therefore, after determining an average friction force (dynamic friction force), a maximum friction force, and a minimum friction force in the section from 3 cm to 10 cm on the graph of the measured friction force, the maximum value of the difference between absolute values of the average friction force and the maximum friction force or the minimum friction force can be defined as the maximum amplitude (A).

Further, the friction force of the anti-reflective film may be obtained by measuring the friction force of the surface of the low refractive index layer because the anti-reflective film includes a hard coating layer and a low refractive index layer formed on the hard coating layer.

More specifically, in the graph of the measurement of friction force with a TAC film measured by applying a load of 400 g to the surface of the anti-reflective film, as the maximum amplitude (A) is 0.1 N or less, 0.001 to 0.08, 0.005 to 0.07, or 0.01 to 0.05 based on the average friction force, the slip property can be improved as compared with the anti-reflective film having the maximum amplitude (A) of more than 0.1 N, thereby realizing the excellent scratch resistance and antifouling property.

Moreover, as the anti-reflective film includes a low refractive index layer formed on the hard coating layer, it may exhibit average reflectance of 0.7% or less in the visible light wavelength region of 380 nm to 780 nm.

Thereby, the anti-reflective film can simultaneously exhibit the high scratch resistance and antifouling property while having low reflectance and high light transmittance.

In the graph of the measurement of friction force with a TAC film on the surface of the anti-reflective film, the maximum amplitude (A) and the average reflectance can be adjusted according to the constitution of the composition forming the low refractive index layer corresponding to the surface of the anti-reflective film, and the formation method thereof.

Specifically, in the graph of the measurement of friction force with a TAC film on the surface of the anti-reflective film, the maximum amplitude (A) and the average reflectance can be realized by adjusting the ratio of the average particle size of the solid inorganic nanoparticles to the hollow inorganic nanoparticles forming the low refractive index layer of the anti-reflective film, so that each particle exhibits different uneven distribution patterns and different distribution patterns in the low refractive index layer.

Specifically, in the low refractive index layer, the ratio of the average particle diameter of the solid inorganic nanoparticles to the average particle diameter of the hollow inorganic nanoparticles may be 0.55 or less.

In this case, the average particle diameter of the hollow inorganic nanoparticles and the average particle diameter of the solid inorganic nanoparticles may be an average value obtained by measuring and calculating the particle diameters of the hollow inorganic nanoparticles and the solid inorganic nanoparticles which are each confirmed through TEM photographs (for example, magnification of 25,000 times) of the anti-reflective film.

More specifically, in the low refractive index layer, as the ratio of the average particle diameter of the solid inorganic nanoparticles to the average particle diameter of the hollow inorganic nanoparticles is 0.55 or less, 0.15 to 0.55, 0.26 to 0.55, 0.27 to 0.40, or 0.280 to 0.380, the hollow inorganic nanoparticles and the solid inorganic nanoparticles in the low refractive index layer may exhibit different uneven distribution patterns and different distribution patterns. For example, the positions where the hollow inorganic nanoparticles and the solid inorganic nanoparticles are mainly distributed may be different from each other based on the interface between the hard coating layer and the low refractive index layer.

In this manner, as the regions where the hollow inorganic nanoparticles and the solid inorganic nanoparticles are mainly distributed in the low refractive index layer are different, the low refractive index layer has a unique internal structure and arrangement pattern of components so that it can have lower reflectance.

Further, as the regions where the hollow inorganic nanoparticles and the solid inorganic nanoparticles are mainly distributed in the low refraction layer are different, the surface characteristics of the low refractive index layer are also changed so that improved scratch resistance and antifouling properties can be achieved.

On the contrary, when the difference between the particle diameter of the hollow inorganic nanoparticles and the particle diameter of the solid inorganic nanoparticles contained in the low refractive index layer is not so large, the hollow inorganic nanoparticles and the solid inorganic nanoparticles do not aggregate with each other or an uneven distribution or agglomeration does not occur according to the kind of the particles, so that it may be difficult to lower the reflectance of the anti-reflective film to a great extent and also to achieve the required scratch resistance and antifouling properties.

The solid inorganic nanoparticles refer to particles having a shape in which an empty space is not present in the inside thereof.

Further, the hollow inorganic nanoparticles refer to particles having a shape in which an empty space is present on the surfaces and/or the insides thereof.

By satisfying the condition that the ratio of the average particle diameter of the solid inorganic nanoparticles to the average particle diameter of the hollow inorganic nanoparticles is 0.55 or less, the anti-reflective film can simultaneously realize the high scratch resistance and antifouling properties while having lower reflectance and higher light transmittance.

In order to more easily control the characteristics of the anti-reflective film and meet the characteristics required in the field of application, hollow inorganic nanoparticles and solid inorganic nanoparticles having a predetermined average particle diameter can be used.

For example, in order for the anti-reflective film to achieve more improved high scratch resistance and antifouling properties while having lower reflectance and higher light transmittance, the average particle diameter of the hollow inorganic nanoparticles may be in the range of 40 nm to 100 nm, and the average particle diameter of the solid inorganic nanoparticles may be in the range of 1 nm to 30 nm.

When the average particle diameter of the hollow inorganic nanoparticles and the solid inorganic nanoparticles satisfies the above-mentioned ratio or the above-mentioned size range, the range of the specific particle diameter is not particularly limited. However, in order to obtain more uniform and improved quality of the anti-reflective film, the particle diameter of the hollow inorganic nanoparticles may in the range of 10 nm to 200 nm, 30 nm to 120 nm, or 38 nm to 80 nm, and the particle diameter of the solid inorganic nanoparticles may be in the range of 0.1 nm to 100 nm, 0.5 nm to 50 nm, or 2 nm to 25 nm.

The diameter of the solid inorganic nanoparticles and the hollow inorganic nanoparticles may mean the longest diameter as confirmed in the cross-section of the particles.

On the other hand, each of the solid inorganic nanoparticles and the hollow inorganic nanoparticles may contain one or more reactive functional groups selected from the group consisting of a hydroxyl group, a (meth)acrylate group, an epoxide group, a vinyl group, and a thiol group on the surface thereof. As each of the solid inorganic nanoparticles and the hollow inorganic nanoparticles contains the above-mentioned reactive functional groups on the surface thereof, the low refractive index layer can have a higher degree of crosslinking, and thus more improved scratch resistance and antifouling properties can be secured.

Each of the solid inorganic nanoparticles and the hollow inorganic nanoparticles may have a hydroxyl group on its surface when separate substituents are not present.

In addition, in the anti-reflective film, the solid inorganic nanoparticles may be more distributed close to the interface between the hard coating layer and the low refractive index layer, compared to the hollow inorganic nanoparticles.

In the past, in order to increase the scratch resistance of the anti-reflective film, the inorganic particles were added in an excess amount, but there was a limit in increasing the scratch resistance, and the reflectance and antifouling properties were rather deteriorated.

On the other hand, when the hollow inorganic nanoparticles and the solid inorganic nanoparticles are distributed so as to be distinguished from each other in the low refractive index layer contained in the anti-reflective film, the anti-reflective film can simultaneously exhibit the high scratch resistance and antifouling properties while having low reflectance and high light transmittance.

Specifically, when the solid inorganic nanoparticles are mainly distributed close to the interface between the hard coating layer and the low refractive index layer in the low refractive index layer of the anti-reflective film, and the hollow inorganic nanoparticles are mainly distributed on the opposite side of the interface, lower reflectance can be achieved compared to the actual reflectance that could previously be obtained using inorganic particles, and further, the low refractive index layer can realize greatly improved scratch resistance and antifouling properties together.

As described above, the low refractive index layer includes a binder resin, and hollow inorganic nanoparticles and solid inorganic nanoparticles which are dispersed in the binder resin, and may be formed on one surface of the hard coating layer, wherein at least 70% by volume of the total volume of solid inorganic nanoparticles may be present within a distance corresponding to 50% of the entire thickness of the low refractive index layer from an interface between the hard coating layer and the low refractive index layer.

"At least 70% by volume of the total volume of solid inorganic nanoparticles are present in a specific region" means that most of the solid inorganic nanoparticles are present in a specific region in the cross-section of the low refractive index layer. Specifically, the at least 70% by volume of the total volume of solid inorganic nanoparticles can be confirmed by measuring the volume of the total volume of solid inorganic nanoparticles, and can also be confirmed through a photograph such as with a transmission electron microscope (TEM).

Whether the hollow inorganic nanoparticles and the solid inorganic nanoparticles are present in specific regions may be determined by measuring each of the hollow inorganic nanoparticles or each of the solid inorganic nanoparticles present in the specific region, respectively, and excluding the particles existing over an interface of the specific region.

Further, as described above, in the low refractive index layer, the hollow inorganic nanoparticles may be mainly distributed on the side opposite to the interface between the hard coating layer and low refractive index layer. Specifically, at least 30% by volume, at least 50% by volume, or at least 70% by volume of the total volume of hollow inorganic nanoparticles may be present at a distance farther than the total volume of solid inorganic nanoparticles from the interface between the hard coating layer and low refractive index layer in a thickness direction of the low refractive index layer.

At least 30% by volume, at least 50% by volume, or at least 70% by volume of the total volume of hollow inorganic nanoparticles may be present in a region exceeding 50% of the entire thickness of the low refractive index layer from an interface between the hard coating layer and the low refractive index layer (a region from a point exceeding 50% of the entire thickness of the low refractive index layer from an interface between the hard coating layer and the low refractive index layer to the other surface of the low refractive index layer facing the interface).

Moreover, at least 70% by volume of the total volume of solid inorganic nanoparticles may be present within a distance corresponding to 30% of the entire thickness of the low refractive index layer from the interface between the hard coating layer and the low refractive index layer.

And at least 70% by volume of the hollow inorganic nanoparticles may be present in a region from a point exceeding 30% of the entire thickness of the low-refractive layer from an interface between the hard coating layer and the low refractive index layer to the other surface of the low refractive index layer facing the interface.

In the low refractive index layer of the anti-refractive film, as the solid inorganic nanoparticles are mainly distributed close to the interface between the hard coating layer and the low refractive index layer and the hollow inorganic nanoparticles are mainly distributed on the side opposite to the interface, two or more portions or two or more layers having different refractive indexes may be formed in the low refractive index layer, thereby further decreasing the reflectance of the anti-reflective film.

Specific distribution of the solid inorganic nanoparticles and the hollow inorganic nanoparticles in the low refractive index layer may be obtained by adjusting the ratio of the average particle diameter between the solid inorganic nanoparticles and the hollow inorganic nanoparticles, and adjusting a drying temperature of a photocurable resin composition for forming a low refractive index layer containing the two kinds of nanoparticles, according to a specific preparation method described below.

When the solid inorganic nanoparticles are mainly distributed in the region of the low refractive index layer close to the interface between the hard coating layer and the low refractive index layer, and the hollow inorganic nanoparticles are mainly distributed on the side opposite to the interface, lower reflectance can be achieved compared to the actual reflectance that could previously be obtained using inorganic particles.

Specifically, the anti-reflective film can show an average reflectance of 1.5% or less, 1.0% or less, 0.50 to 1.0%, 0.7% less, 0.60% to 0.70%, or 0.62% to 0.67% in a visible light wavelength region of 380 nm to 780 nm.

As described above, unique effects of the anti-reflective film of the embodiment, for example, characteristics capable of simultaneously realizing the high scratch resistance and antifouling properties while having high reflectance and high light transmittance, and further capable of enhancing the screen sharpness of the display device, are due to the ratio of the average particle diameter between the hollow inorganic nanoparticles and the solid inorganic nanoparticles, and the layer separation of reflective index by the distribution of the hollow inorganic nanoparticles and the solid inorganic nanoparticles in the low refractive layer. Thus, the maximum amplitude (A) of 0.1 N or less based on the average friction force is realized in the graph of the measurement of friction force with a TAC film measured by applying a load of 400 g to the surface.

Meanwhile, in the anti-reflective film of the embodiment, the low refractive index layer may include a first layer containing at least 70% by volume of the total volume of solid inorganic nanoparticles and a second layer containing at least 70% by volume of the total volume of hollow inorganic nanoparticles, wherein the first layer may be positioned to be closer to the interface between the hard coating layer and the low refractive index layer, compared to the second layer.

As described above, in the low refractive index layer of the anti-reflective film, the solid inorganic nanoparticles are mainly distributed close to the interface between the hard coating layer and the low refractive index layer, the hollow inorganic nanoparticles are mainly distributed on the side opposite to the interface, and the regions where the solid inorganic nanoparticles and the hollow inorganic nanoparticles are mainly distributed may form independent layers, respectively, which may be visibly confirmed in the low refractive index layer.

Further, the first layer containing at least 70% by volume of the total volume of solid inorganic nanoparticles may be positioned within a distance corresponding to 50% of the entire thickness of the low refractive index layer from an interface between the hard coating layer and the low refractive index layer.

More specifically, the first layer containing at least 70% by volume of the total volume of solid inorganic nanoparticles may be present within a distance corresponding to 30% of the entire thickness of the low refractive index layer from an interface between the hard coating layer and the low refractive index layer.

Furthermore, as described above, in the low refractive index layer, the hollow inorganic nanoparticles may be mainly distributed on the side opposite to the interface between the hard coating layer and the low refractive index layer. Specifically, at least 30% by weight, at least 50% by weight, or at least 70% by weight of the hollow inorganic nanoparticles may be present at a distance farther than that of the entire solid inorganic nanoparticles from the interface between the hard coating layer and low refractive index layer in a thickness direction of the low refractive index layer.

Thus, as described above, the first layer may be positioned to be closer to the interface between the hard coating layer and the low refractive index layer, compared to the second layer.

Further, as described above, it can be visually confirmed that each of the first layer and the second layer, which is a region where each of the solid inorganic nanoparticles and the hollow inorganic nanoparticles is mainly distributed, is present in the low refractive index layer.

For example, it can be visually confirmed that each of the first layer and the second layer is present in the low refractive index layer by using a transmission electron microscope, a scanning electron microscope, or the like. In addition, the ratio between the solid inorganic nanoparticles and the hollow inorganic nanoparticles distributed in each of the first layer and the second layer in the low refractive index layer can also be confirmed.

Meanwhile, each of the first layer containing at least 70% by volume of the total volume of solid inorganic nanoparticles and the second layer containing at least 70% by volume of the total volume of hollow inorganic nanoparticles can share a common optical property in one layer, and thus it can be defined as one layer.

More specifically, when polarization ellipticity measured by an ellipsometry method is fitted to a Cauchy model of the following General Formula 1, each of the first layer and the second layer has specific Cauchy parameters A, B, and C and thus the first layer and the second layer can be distinguished from each other.

Also, since the thicknesses of the first layer and the second layer can be derived by fitting the polarization ellipticity measured by an ellipsometry method to a Cauchy model of the following General Formula 1, the first layer and the second layer in the low refractive index layer can be defined.

$$n(\lambda) = A + \frac{B}{\lambda^2} + \frac{C}{\lambda^4}$$ [General Formula 1]

In the above General Formula 1, n(λ) is a refractive index at a wavelength λ, λ is in a range of 300 nm to 1800 nm, and A, B, and C are Cauchy parameters.

On the other hand, when the polarization ellipticity measured by an ellipsometry method is fitted to a Cauchy model of General Formula 1, the derived Cauchy parameters A, B, and C may be an average value in a single layer.

Thus, when an interface is present between the first layer and the second layer, a region where the Cauchy parameters A, B, and C of the first layer and the second layer overlap may exist.

However, even in this case, the thickness and the position of the first layer and the second layer can be specified depending on the region that satisfies the average value of Cauchy parameters A, B, and C of each of the first layer and the second layer.

For example, when the polarization ellipticity measured by an ellipsometry method is fitted to a Cauchy model of General Formula 1 for the first layer included in the low reflective index layer, it can satisfy the condition that A is 1.0 to 1.65, B is 0.0010 to 0.0350, and C is 0 to $1*10^{-3}$. Also, with respect to the first layer included in the low refractive index layer, it can satisfy the condition that, while the A is 1.30 to 1.55, 1.40 to 1.52, or 1.491 to 1.511, and while the B is 0 to 0.005, 0 to 0.00580, or 0 to 0.00573, the C is 0 to $1*10^{-3}$, 0 to $5.0*10^{-4}$, or 0 or $4.1352*10^{-4}$.

In addition, when the polarization ellipticity measured by an ellipsometry method is fitted to a Cauchy model of General Formula 1 for the second layer included in the low reflective index layer, it can satisfy the condition that A is 1.0 to 1.50, B is 0 to 0.007, and C is 0 to $1*10^{-3}$. Also, with respect to the second layer included in the low refractive index layer, it can satisfy the condition that, while the A is 1.10 to 1.40, 1.20 to 1.35, or 1.211 to 1.349, and while the B is 0 to 0.007, 0 to 0.00550, or 0 to 0.00513, the C is 0 to $1*10^{-3}$, 0 to $5.0*10^{-4}$, or 0 to $4.8685*10^{-4}$.

On the other hand, in the anti-reflective film of the embodiment(s) described above, the first layer and the second layer included in the low refractive index layer may have different refractive index ranges.

More specifically, the first layer included in the low refractive index layer may have a refractive index of 1.420 to 1.600, 1.450 to 1.550, 1.480 to 1.520, or 1.491 to 1.511, at 550 mm.

Further, the second layer included in the low refractive index layer may have a refractive index of 1.200 to 1.410, 1.210 to 1.400, or 1.211 to 1.375, at 550 mm.

The measurement of the above-described refractive index can be performed by using a conventionally known method. For example, it may be determined by calculating the polarization ellipticity measured at a wavelength of 380 nm to 1000 nm and the refractive index at a wavelength of 550 nm using a Cauchy model for each of the first layer and the second layer included in the low refractive index layer.

Meanwhile, the above-described low refractive index layer can be produced from a photocurable coating composition containing a photopolymerizable compound, a fluorine-containing compound containing a photoreactive functional group, hollow inorganic nanoparticles, solid inorganic nanoparticles, and a photoinitiator.

Accordingly, the binder resin contained in the low refractive index layer may include a crosslinked (co)polymer between a (co)polymer of a photopolymerizable compound and a fluorine-containing compound containing a photoreactive functional group.

The photopolymerizable compound contained in the photocurable coating composition of this embodiment can form a substrate of the binder resin of the low refractive index layer to be produced.

Specifically, the photopolymerizable compound may include a monomer or an oligomer including a (meth)acrylate or a vinyl group.

More specifically, the photopolymerizable compound may include a monomer or an oligomer containing one or more, two or more, or three or more of (meth)acrylates or vinyl groups.

Specific examples of the monomer or oligomer containing (meth)acrylate include pentaerythritol tri(meth)acrylate, pentaerythritol tetra(meth)acrylate, dipentaerythritol penta(meth)acrylate, dipentaerythritol hexa(meth)acrylate, tripentaerythritol hepta(meth)acrylate, trilene diisocyanate, xylene diisocyanate, hexamethylene diisocyanate, trimethylolpropane tri(meth)acrylate, trimethylolpropane polyethoxy tri(meth)acrylate, trimethylolpropane trimethacrylate, ethylene glycol dimethacrylate, butanediol dimethacrylate, hexaethyl methacrylate, butyl methacrylate, or a mixture of two or more thereof, or a urethane-modified acrylate oligomer, epoxide acrylate oligomer, ether acrylate oligomer, dendritic acrylate oligomer, or a mixture of two or more thereof.

In this case, the molecular weight of the oligomers is preferably 1000 to 10,000.

Specific examples of the monomer or oligomer containing a vinyl group may include divinylbenzene, styrene, or para-methyl styrene.

The content of the photopolymerizable compound in the photocurable coating composition is not particularly limited. However, considering the mechanical properties of the finally produced low refractive index layer or antireflection film, the content of the photopolymerizable compound in the solid content of the photocurable coating composition may be 5% by weight to 80% by weight.

The solid content of the photocurable coating composition means only a solid component, excluding a liquid component, in the photocurable coating composition, for example, a component such as an organic solvent which may be optionally included as described below.

On the other hand, the photopolymerizable compound may further include a fluorine-based (meth)acrylate-based monomer or oligomer in addition to the monomer or oligomer described above.

When the fluorine-based (meth)acrylate-based monomer or oligomer is further included, the weight ratio of the fluorine-based (meth)acrylate-based monomer or oligomer to the monomer or oligomer containing a (meth)acrylate or vinyl group may be 0.1% to 10%.

Specific examples of the fluorine-based (meth)acrylate-based monomer or oligomer may include at least one compound selected from the group consisting of the following Chemical Formulae 1 to 5.

[Chemical Formula 1]

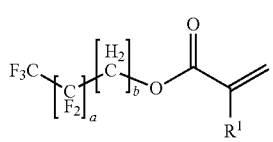

In the above Chemical Formula 1, $R^1$ is a hydrogen group, or an alkyl group having 1 to 6 carbon atoms, a is an integer of 0 to 7, and b is an integer of 1 to 3.

[Chemical Formula 2]

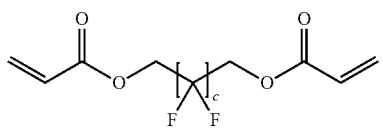

In the above Chemical Formula 2, c is an integer of 1 to 10.

[Chemical Formula 3]

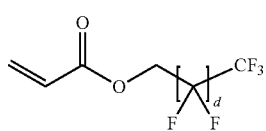

In the above Chemical Formula 3, d is an integer of 1 to 11.

[Chemical Formula 4]

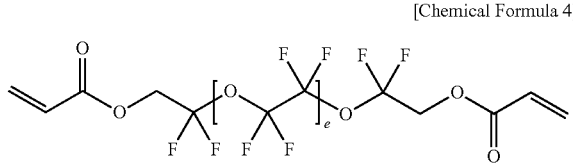

In the above Chemical Formula 4, e is an integer of 1 to 5.

[Chemical Formula 5]

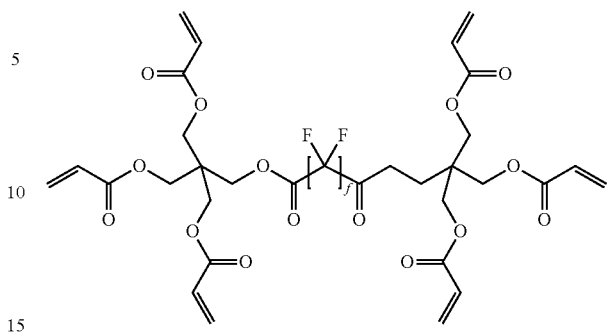

In the above Chemical Formula 5, f is an integer of 4 to 10.

On the other hand, the low refractive index layer may include a portion derived from the fluorine-containing compound containing the photoreactive functional group.

One or more photoreactive functional groups may be contained or substituted in the fluorine-containing compounds containing a photoreactive functional group. The photoreactive functional group means a functional group capable of participating in the polymerization reaction by irradiation with light, for example, by irradiation with visible light or ultraviolet light.

The photoreactive functional group may include various functional groups known to be capable of participating in the polymerization reaction by irradiation with light. Specific examples thereof include a (meth)acrylate group, an epoxide group, a vinyl group, and a thiol group.

Each of the fluorine-containing compounds containing the photoreactive functional group may have a weight average molecular weight (weight average molecular weight in terms of polystyrene measured by GPC method) of 2,000 to 200,000, and preferably 5,000 to 100,000.

If the weight average molecular weight of the fluorine-containing compound containing the photoreactive functional group is too small, the fluorine-containing compound in the photocurable coating composition cannot be uniformly and effectively arranged on the surface and are located inside the low refractive index layer finally produced. Thus, the antifouling property that the surface of the low refractive index has is lowered and the crosslinking density of the low refractive index layer is lowered, so that the overall mechanical properties such as the strength and the scratch resistance may be deteriorated.

In addition, if the weight average molecular weight of the fluorine-containing compound containing the photoreactive functional group is too high, the compatibility with other components in the photocurable coating composition may be lowered, and thus the haze of the low refractive index layer finally produced may be increased or the light transmittance may be lowered, and the strength of the low refractive index layer may also be lowered.

Specifically, the fluorine-containing compound containing the photoreactive functional group includes: i) an aliphatic compound or an aliphatic cyclic compound in which at least one photoreactive functional group is substituted and at least one fluorine is substituted for at least one carbon; ii) a heteroaliphatic compound or heteroaliphatic cyclic compound in which at least one photoreactive functional group is substituted, at least one hydrogen is substituted with fluorine, and at least one carbon is substituted with silicon;

iii) a polydialkylsiloxane-based polymer (for example, a polydimethylsiloxane-based polymer) in which at least one photoreactive functional group is substituted and at least one fluorine is substituted for at least one silicon; iv) a polyether compound in which at least one photoreactive functional group is substituted and at least one hydrogen is substituted with fluorine; or a mixture of two or more of i) to iv) or copolymers thereof.

The photocurable coating composition may contain 20 to 300 parts by weight of the fluorine-containing compound containing the photoreactive functional group based on 100 parts by weight of the photopolymerizable compound.

When the fluorine-containing compound containing the photoreactive functional group is excessively added relative to the photopolymerizable compound, the coating property of the photocurable coating composition of the embodiment may be lowered, or the low refractive index layer obtained from the photocurable coating composition may not have sufficient durability or scratch resistance.

Further, when the amount of the fluorine-containing compound containing the photoreactive functional group is too small relative to the photopolymerizable compound, the low refractive index layer obtained from the photocurable coating composition may not have sufficient mechanical properties such as antifouling and scratch resistance properties.

The fluorine-containing compound containing the photoreactive functional group may further contain silicon or a silicon compound.

That is, the fluorine-containing compound containing a photoreactive functional group can optionally contain silicon or a silicon compound therein. Specifically, the content of silicon in the fluorine-containing compound containing the photoreactive functional group may be 0.1% by weight to 20% by weight.

The silicon contained in the fluorine-containing compounds containing the photoreactive functional group can increase the compatibility with other components contained in the photocurable coating composition of the embodiment, whereby it can prevent the generation of haze on the finally produced refractive layer and serve to enhance transparency.

If the content of silicon in the fluorine-containing compounds containing the photoreactive functional group is too large, compatibility between the other components contained in the photocurable coating composition and the fluorine-containing compound may be rather lowered, whereby the finally produced low refractive index layer and antireflection film may not have sufficient light transmittance and antireflection performance, and thus the antifouling property of the surface may also be lowered.

The low refractive index layer may include 10 to 400 parts by weight of the hollow inorganic nanoparticles and 10 to 400 parts by weight of the solid inorganic nanoparticles, relative to 100 parts by weight of the (co)polymer of the photopolymerizable compound.

When the content of the hollow inorganic nanoparticles and the solid inorganic nanoparticles in the low refractive index layer is excessively large, in the process of preparing the low refractive index layer, the phase separation between the hollow inorganic nanoparticles and the solid inorganic nanoparticles does not sufficiently occur and they are mixed, so that the reflectivity can be increased, and further the surface irregularities can be excessively generated and thus the antifouling property can be lowered.

Further, when the content of the hollow inorganic nanoparticles and the solid inorganic nanoparticles in the low refractive index layer is excessively small, it may be difficult for a majority of the solid inorganic nanoparticles to be located in a region close to the interface between the hard coating layer and the low refractive index layer, and the reflectivity of the low refractive index layer can be greatly increased.

The low refractive index layer may have a thickness of 1 nm to 300 nm, 50 nm to 200 nm, or 85 nm to 300 nm.

Meanwhile, as the hard coating layer, a hard coating layer commonly known in the art can be used without particular limitation.

As an example of the hard coating film, a hard coating layer including a binder resin containing a photocurable resin and organic or inorganic fine particles dispersed in the binder resin may be mentioned.

The photocurable resin contained in the hard coating layer may be a polymer of a photocurable compound capable of causing a polymerization reaction when irradiated with light such as ultraviolet light or the like, and may be one that is conventional in the relevant art.

Specifically, the photocurable resin may include at least one selected from a reactive acrylate oligomer group consisting of a urethane acrylate oligomer, an epoxide acrylate oligomer, a polyester acrylate, and a polyether acrylate; and a polyfunctional acrylate monomer consisting of dipentaerythritol hexaacrylate, dipentaerythritol hydroxy pentaacrylate, pentaerythritol tetraacrylate, pentaerythritol triacrylate, trimethylene propyl triacrylate, propoxylated glycerol triacrylate, trimethyl propane ethoxy triacrylate, 1,6-hexanediol diacrylate, propoxylated glycerol triacrylate, tripropylene glycol diacrylate, and ethylene glycol diacrylate.

The particle diameter of the organic or inorganic fine particles is not specifically limited, but for example, the organic fine particles may have a particle diameter of 1 to 10 μm, and the inorganic particles may have a particle diameter of 1 nm to 500 nm, or 1 nm to 300 nm.

The particle diameter of the organic or inorganic fine particles may be defined as a volume average particle diameter.

In addition, specific examples of the organic or inorganic fine particles contained in the hard coating film are not limited, but for example, the organic or inorganic fine particles may be an organic fine particle composed of an acrylic-based resin, a styrene-based resin, an epoxide resin, and a nylon resin, or an inorganic fine particle composed of silicon oxide, titanium dioxide, indium oxide, tin oxide, zirconium oxide, and zinc oxide.

The binder resin of the hard coating layer may further include a high molecular weight (co)polymer having a weight average molecular weight of 10,000 or more.

The high molecular weight (co)polymer may be at least one selected from the group consisting of a cellulose-based polymer, an acrylic-based polymer, a styrene-based polymer, an epoxide-based polymer, a nylon-based polymer, a urethane-based polymer, and a polyolefin-based polymer.

On the other hand, as another example of the hard coating film, a hard coating film including a binder resin of a photocurable resin and an antistatic agent dispersed in the binder resin may be mentioned.

The photocurable resin contained in the hard coating layer may be a polymer of a photocurable compound capable of causing a polymerization reaction when irradiated with light such as ultraviolet light or the like, and may be one that is conventional in the related art.

However, preferably, the photocurable compound may be a polyfunctional (meth)acrylate-based monomer or oligomer. In this case, it is advantageous for the number of (meth)acrylate-based functional groups to be 2 to 10, preferably 2 to 8, and more preferably 2 to 7, in terms of securing the physical properties of the hard coating layer.

More preferably, the photocurable compound may be at least one selected from the group consisting of pentaerythritol tri(meth)acrylate, pentaerythritol tetra(meth)acrylate, dipentaerythritol penta(meth)acrylate, dipentaerythritol hexa(meth)acrylate, dipentaerythritol hepta(meth)acrylate, tripentaerythritol hepta(meth)acrylate, trilene diisocyanate, xylene diisocyanate, hexamethylene diisocyanate, trimethylolpropane tri(meth)acrylate, and trimethylolpropane polyethoxy tri(meth)acrylate.

The antistatic agent may be quaternary ammonium salt compounds; pyridinium salts; cationic compounds having 1 to 3 amino groups; anionic compounds such as a sulfonic acid base, a sulfuric ester base, a phosphoric ester base, a phosphonic acid base, and the like; amphoteric compounds such as amino acid-based or aminosulfuric acid ester-based compounds; nonionic compounds such as imino alcohol-based compounds, glycerin-based compounds, polyethylene glycol-based compounds, and the like; organometallic compounds such as metal alkoxide compounds including tin, titanium, or the like; metal chelate compounds such as an acetylacetonate salt of the organometallic compounds; two or more reactants or polymers of these compounds; and a mixture of two or more of these compounds.

Herein, the quaternary ammonium salt compound may be a compound having at least one quaternary ammonium salt group in the molecule, and a low-molecule type or a high-molecule type can be used without limitation.

Further, as the antistatic agent, a conductive polymer and metal oxide fine particles may also be used.

The conductive polymer may include aromatic conjugated poly(paraphenylene), heterocyclic conjugated polypyrrole, polythiophene, aliphatic conjugated polyacetylene, conjugated polyaniline containing a heteroatom, a mixed-type conjugated poly(phenylene vinylene), a conjugated double-chain type of conjugated compound having a plurality of conjugated chains in the molecule, a conductive complex obtained by graft or block copolymerization of a conjugated polymer chain with a saturated polymer, and the like.

Furthermore, the metal oxide fine particles include zinc oxide, antimony oxide, tin oxide, cerium oxide, indium tin oxide, indium oxide, aluminum oxide, antimony doped-tin oxide, aluminum doped-zinc oxide, and the like.

The hard coating film including a binder resin of the photocurable resin; and an antistatic agent dispersed in the binder resin may further include at least one compound selected from the group consisting of an alkoxysilane-based oligomer and a metal alkoxide-based oligomer.

The alkoxysilane-based compound may be one that is conventional in the relevant art, but preferably, it may be at least one compound selected from the group consisting of tetramethoxysilane, tetraethoxysilane, tetraisopropoxysilane, methyltrimethoxysilane, methyltriethoxysilane, methacryloxypropyl trimethoxysilane, glycidoxypropyl trimethoxysilane, and glycidoxypropyl triethoxysilane.

In addition, the metal alkoxide-based oligomer can be prepared through a sol-gel reaction of a composition including a metal alkoxide-based compound and water.

The sol-gel reaction can be carried out by a method similar to the above-described method for preparing an alkoxysilane-based oligomer.

However, since the metal alkoxide-based compound can rapidly react with water, the sol-gel reaction can be performed by a method of diluting the metal alkoxide-based compound in an organic solvent and then slowly dripping water thereto.

At this time, considering the reaction efficiency or the like, the molar ratio (based on metal ions) of the metal alkoxide-based compound to water is preferably adjusted within the range of 3 to 170.

Herein, the metal alkoxide-based compound may be at least one compound selected from the group consisting of titanium tetra-isopropoxide, zirconium isopropoxide, and aluminum isopropoxide.

The hard coating film may have a thickness of 0.1 μm to 100 μm.

A substrate bonded to the other surface of the hard coating layer can be further included. The specific type and thickness of the substrate are not particularly limited, and any substrate known to be usable in the production of a low refractive index layer or antireflection film may be used without particular limitation.

For example, polycarbonate, a cycloolefin polymer, polyester, triacetyl cellulose, or the like may be mentioned as the substrate.

The low refractive index layer may further include a silane-based compound containing at least one reactive functional group selected from the group consisting of a vinyl group and a (meth)acrylate group.

The silane-based compound containing at least one reactive functional group selected from the group consisting of the vinyl group and the (meth)acrylate group can increase the mechanical properties, for example, scratch resistance, of the low refractive index layer due to the reactive functional group.

Further, since the low refractive index layer includes a silane-based compound containing at least one reactive functional group selected from the group consisting of the vinyl group and the (meth)acrylate group, more improved scratch resistance can be secured.

Further, due to a silane functional group or a silicon atom contained in the silane-based compound containing at least one reactive functional group selected from the group consisting of the vinyl group and the (meth)acrylate group, the internal characteristics of the low refractive index layer can be improved. More specifically, as a silane functional group or a silicon atom contained in the silane-based compound is uniformly distributed in the low refractive index layer, lower average reflectance can be realized. Further, due to the silane functional group or the silicon atom, inorganic fine particles uniformly distributed in the low refractive index layer are uniformly bonded to the photopolymerizable compound, and thus scratch resistance of the finally produced antireflective film can be improved.

As described above, as the silane-based compound containing at least one reactive functional group selected from the group consisting of the vinyl group and the (meth)acrylate group has a chemical structure containing the reactive functional group and the silicon atom at the same time, the internal properties of the low refractive index layer can be optimized for reducing the refractive index. Thereby, the low refractive index layer can realize low reflectance and high light transmittance and also secure a uniform crosslinking density, thereby securing excellent abrasion resistance or scratch resistance.

Specifically, the silane-based compound containing at least one reactive functional group selected from the group consisting of the vinyl group and the (meth)acrylate group may contain the reactive functional group with an equivalent weight of 100 to 1000 g/mol.

If the content of the reactive functional group in the silane-based compound containing at least one reactive functional group selected from the group consisting of the vinyl group and the (meth) acrylate group is too small, it may be difficult to sufficiently increase the scratch resistance and mechanical properties of the low refractive index layer.

On the other hand, if the content of the reactive functional group in the silane-based compound containing at least one reactive functional group selected from the group consisting of the vinyl group and the (meth) acrylate group is too high, the homogeneity in the low refractive index layer and the dispersibility of the inorganic fine particles are lowered, and the light transmittance or the like of the low refractive index layer may be rather lowered.

The silane-based compound containing at least one reactive functional group selected from the group consisting of the vinyl group and the (meth) acrylate group may have a weight average molecular weight (weight average molecular weight in terms of polystyrene measured by GPC method) of 100 to 5000, or 200 to 3000.

Specifically, the silane-based compound containing at least one reactive functional group selected from the group consisting of the vinyl group and the (meth)acrylate group may include at least one reactive functional group selected from the group consisting of a vinyl group and a (meth) acrylate group, at least one trialkoxysilane group in which an alkylene group having 1 to 10 carbon atoms is bonded, and an organic functional group including a urethane functional group.

The trialkoxysilane group may be a functional group in which three alkoxy groups having 1 to 3 carbon atoms are substituted in a silicon compound.

Specific chemical structures of the silane-based compound containing at least one reactive functional group selected from the group consisting of the vinyl group and the (meth)acrylate group are not limited, but specific examples thereof include compounds represented by the following Chemical Formulas 11 to 14.

[Chemical Formula 11]

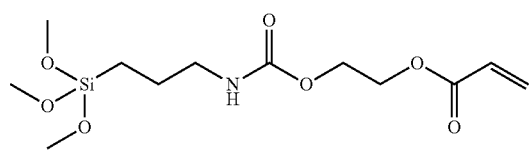

[Chemical Formula 12]

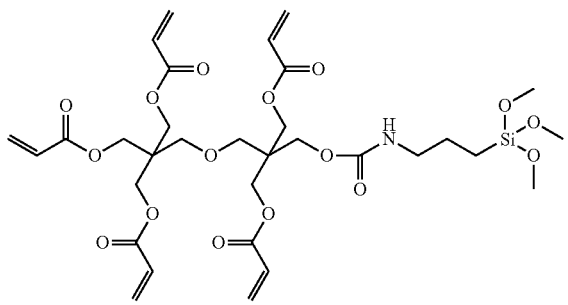

[Chemical Formula 13]

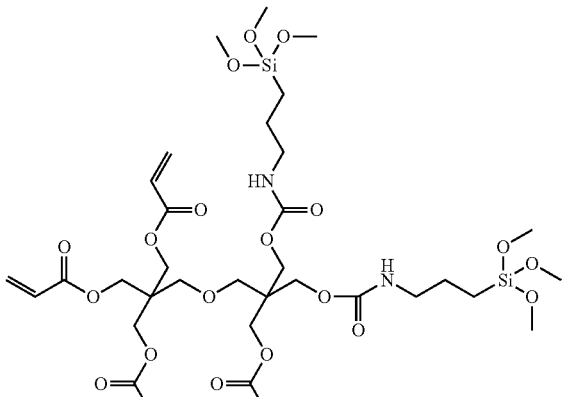

[Chemical Formula 14]

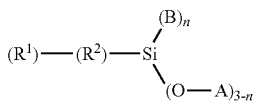

In Chemical Formula 14, $R^1$ is

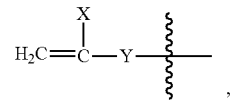

X is any one of hydrogen, a monovalent residue derived from an aliphatic hydrocarbon having 1 to 6 carbon atoms, an alkoxy group having 1 to 6 carbon atoms, and an alkoxycarbonyl group having 1 to 4 carbon atoms, Y is a single bond, —CO—, or —COO—, $R^2$ is a divalent residue derived from an aliphatic hydrocarbon having 1 to 20 carbon atoms, or a divalent residue in which at least one hydrogen of the divalent residue is substituted with a hydroxyl group, a carboxyl group, or an epoxy group, or a divalent residue in which at least one $CH_2$— of the divalent residue is substituted with —O—, —CO—O—, —O—CO—, or —O—CO—O— so that oxygen atoms are not directly linked, A is any one of hydrogen and a monovalent residue derived from an aliphatic hydrocarbon having 1 to 6 carbon atoms, B is any one of a monovalent residue derived from an aliphatic hydrocarbon having 1 to 6 carbon atoms, and n is an integer of 0 to 2.

One example of the compound of Chemical Formula 14 may be a compound of the following Chemical Formula 15.

[Chemical Formula 15]

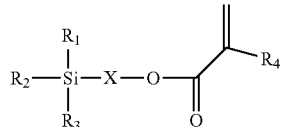

In Chemical Formula 15, $R_1$, $R_2$, and $R_3$ are an alkoxy group having 1 to 3 carbon atoms or hydrogen, X is a linear or branched alkylene group having 1 to 10 carbon atoms, and $R_4$ is an alkyl group having 1 to 3 carbon atoms or hydrogen.

The low refractive index layer may include 2 to 40 parts by weight of a silane-based compound containing at least one reactive functional group selected from the group consisting of the vinyl group and the (meth)acrylate group, based on 100 parts by weight of the photopolymerizable compound contained therein.

When the content of the silane-based compound containing at least one reactive functional group selected from the group consisting of the vinyl group and the (meth)acrylate group relative to the photopolymerizable compound is too small, it may be difficult to sufficiently secure the scratch resistance of the low refractive index layer.

In addition, when the content of the silane-based compound containing at least one reactive functional group selected from the group consisting of the vinyl group and the (meth)acrylate group relative to the photopolymerizable compound is too large, compatibility with other components contained in the low refractive index layer may be greatly lowered and thus haze may be generated in the low refractive index layer or the anti-reflective film or its transparency may be lowered, and the scratch resistance may be rather lowered.

Meanwhile, the anti-reflective film according to the embodiment may be provided through a method for preparing the anti-reflective film including the steps of: coating a resin composition for forming a low refractive index layer containing a photocurable compound or its (co)polymer, a fluorine-containing compound containing a photoreactive functional group, a photoinitiator, a hollow inorganic nanoparticle, and a solid inorganic nanoparticle onto the hard coating layer and drying the coated resin composition at a temperature of 35° C. to 100° C.; and photocuring the dried product of the resin composition.

Specifically, the anti-reflective film provided by the method for preparing an anti-reflective film is configured such that the hollow inorganic nanoparticles and the solid inorganic nanoparticles are distributed so as to be distinguishable from each other in the low refractive index layer, and thereby it can simultaneously realize the high scratch resistance and antifouling properties while having low reflectivity and high light transmittance.

More specifically, the anti-reflective film includes: a hard coating layer; and a low refractive index layer formed on one surface of the hard coating layer and containing a binder resin, and hollow inorganic nanoparticles and solid inorganic nanoparticles dispersed in the binder resin, wherein at least 70% by volume of the total volume of solid inorganic nanoparticles may be present within a distance corresponding to 50% of the total thickness of the low refractive index layer from the interface between the hard coating layer and the low refractive index layer.

Further, 30% by volume or more of the total volume of hollow inorganic nanoparticles may be present at a distance farther than the total solid inorganic nanoparticles from the interface between the hard coating layer and low refractive index layer in a thickness direction of the low refractive index layer.

Also, 70% by volume or more of the total volume of solid inorganic nanoparticles may be present within a distance corresponding to 30% of the total thickness of the low refractive index layer from the interface between the hard coating layer and the low refractive index layer.

In addition, 70% by volume or more of the total volume of hollow inorganic nanoparticles may be present in a region exceeding 30% of the total thickness of the low refractive index layer from the interface between the hard coating layer and the low refractive index layer.

In the antireflection film provided by the method for preparing an antireflection film, the low refractive index layer may include a first layer containing 70% by volume or more of the total volume of solid inorganic nanoparticles and a second layer containing 70% by volume or more of the total volume of hollow inorganic nanoparticles, wherein the first layer may be positioned to be closer to the interface between the hard coating layer and the low refractive index layer, compared to the second layer.

The low refractive index layer may be formed by coating a resin composition for forming a low refractive index layer containing a photocurable compound or its (co)polymer, a fluorine-containing compound containing a photoreactive functional group, a photoinitiator, a hollow inorganic nanoparticle, and a solid inorganic nanoparticle on the hard coating layer, and drying the coated resin composition at a temperature of 35° C. to 100° C., or 40° C. to 80° C.

If the temperature for drying the resin composition for forming a low refractive index layer coated on the hard coating layer is less than 35° C., the antifouling property of the low refractive index layer formed as described above may be greatly lowered. Further, if the temperature for drying the resin composition for forming a low refractive index layer coated on the hard coating layer is greater than 100° C., in the process of preparing the low refractive index layer, the phase separation between the hollow inorganic nanoparticles and the solid inorganic nanoparticles does not sufficiently occur and they are mixed, so that the scratch resistance and antifouling properties of the low refractive index layer are lowered and the reflectivity can also be greatly increased.

By adjusting the difference in density between the solid inorganic nanoparticles and the hollow inorganic nanoparticles together with the drying temperature, in the process of drying the resin composition for forming a low refractive index layer coated on the hard coating layer, a low refractive index layer having the above-described characteristics can be formed. The solid inorganic nanoparticles can have a density higher by 0.50 g/cm$^3$ or more compared to the hollow inorganic nanoparticles, and due to such a difference in density, the solid inorganic nanoparticles may be located closer to the hard coating layer in the low refractive index layer formed on the hard coating layer.

Meanwhile, the step of drying the resin composition for forming a low refractive index layer coated on the hard coating layer at a temperature of 35° C. to 100° C. may be performed for 10 seconds to 5 minutes, or 30 seconds to 4 minutes.

If the drying time is too short, the phase separation phenomenon between the solid inorganic nanoparticles and the hollow inorganic nanoparticles described above may not sufficiently occur.

On the contrary, if the drying time is too long, the formed low refractive index layer may corrode the hard coating layer.

Meanwhile, the low refractive index layer can be produced from a photocurable coating composition containing a photopolymerizable compound or a (co)polymer thereof, a fluorine-containing compound containing a photoreactive functional group, hollow inorganic nanoparticles, solid inorganic nanoparticles, and a photoinitiator.

The low refractive index layer can be obtained by coating the photocurable coating composition onto a predetermined substrate and photocuring the coated product.

The specific type and thickness of the substrate are not particularly limited, and a substrate known to be used in the production of the low refractive index layer or the antireflection film can be used without particular limitation.

The method and apparatus commonly used for coating the photocurable coating composition can be used without particular limitation. For example, a bar coating method, such as one using a Mayer bar or the like, a gravure coating method, a 2-roll reverse coating method, a vacuum slot die coating method, a 2-roll coating method, or the like can be used.

The low refractive index layer may have a thickness of 1 nm to 300 nm, or 50 nm to 200 nm.

Thus, the thickness of the photocurable coating composition coated onto the predetermined substrate can be about 1 nm to 300 nm, or 50 nm to 200 nm.

In the step of photocuring the photocurable coating composition, an ultraviolet light or visible light having a wavelength of 200 nm to 400 nm can be irradiated, and the amount of exposure is preferably 100 mJ/cm$^2$ to 4000 mJ/cm$^2$.

The exposure time is not particularly limited, and can be appropriately varied depending on the exposure apparatus used, the wavelength of the irradiated light, or the amount of exposure.

Further, in the step of photocuring the photocurable coating composition, nitrogen purging or the like may be performed to apply nitrogen atmosphere conditions.

Specific contents of the photocurable compound, the hollow inorganic nanoparticles, the solid inorganic nanoparticles, and the fluorine-containing compounds containing the photoreactive functional group include those given above in the antireflection film of the embodiments.

Each of the hollow inorganic particles and the solid inorganic nanoparticles may be contained in the composition as a colloidal phase dispersed in a predetermined dispersion medium.

The respective colloidal phases including the hollow inorganic particles, and the solid inorganic nanoparticles may include an organic solvent as a dispersion medium.

The colloidal content of each of the hollow inorganic nanoparticles and the solid inorganic nanoparticles can be determined in consideration of the respective content ranges of the hollow inorganic nanoparticles and the solid inorganic nanoparticles in the photocurable coating composition, the viscosity of the photocurable coating composition, and the like. For example, the solid content of each of the hollow inorganic nanoparticles and the solid inorganic nanoparticles in the colloidal phase may be 5% by weight to 60% by weight.

Herein, examples of the organic solvent in the dispersion medium include alcohols such as methanol, isopropyl alcohol, ethylene glycol, butanol, and the like; ketones such as methyl ethyl ketone, methyl isobutyl ketone, and the like; aromatic hydrocarbons such as toluene, xylene, and the like; amides such as dimethylformamide, dimethylacetamide, N-methylpyrrolidone, and the like; esters such as ethyl acetate, butyl acetate, gamma-butyrolactone, and the like; ethers such as tetrahydrofuran, 1,4-dioxane, and the like; or a mixture thereof.

As the photopolymerization initiator, any compound known to be usable in a photocurable resin composition may be used without particular limitation. Specifically, a benzophenone-based compound, an acetophenone-based compound, a nonimidazole-based compound, a triazine-based compound, an oxime-based compound, or a mixture of two or more thereof may be used.

The photopolymerization initiator may be used in an amount of 1 to 100 parts by weight based on 100 parts by weight of the photopolymerizable compound.

If the amount of the photopolymerization initiator is too small, the photopolymerization initiator can be uncured in the photocuring step of the photocurable coating composition to generate a residual material.

If the amount of the photopolymerization initiator is too large, the unreacted initiator may remain as impurities or the crosslinking density may be lowered, and thus the mechanical properties of the resulting film may be deteriorated, or the reflectivity may be greatly increased.

Meanwhile, the photocurable coating composition may further include an inorganic solvent.

Non-limiting examples of the organic solvent include ketones, alcohols, acetates, and ethers, or a mixture of two or more thereof.

Specific examples of such organic solvent include ketones such as methyl ethyl ketone, methyl isobutyl ketone, acetylacetone, or isobutyl ketone; alcohols such as methanol, ethanol, diacetone alcohol, n-propanol, i-propanol, n-butanol, i-butanol, or t-butanol; acetates such as ethyl acetate, i-propyl acetate, or polyethylene glycol monomethyl ether acetate; ethers such as tetrahydrofuran and propylene glycol monomethyl ether; or a mixture of two or more thereof.

The organic solvent may be added at the time of mixing the respective components contained in the photocurable coating composition, or may be added to the photocurable coating composition while the respective components are added in a state of being dispersed or mixed in the organic solvent.

If the content of the organic solvent in the photocurable coating composition is too small, the flowability of the photocurable coating composition may be reduced, resulting in defects such as generation of stripes in the finally produced film or the like.

Further, if the organic solvent is added in an excessive amount, the solid content is lowered, and the physical properties and surface properties of the film may be deteriorated due to insufficient coating and film formation, and defects may occur during the drying and curing processes.

Accordingly, the photocurable coating composition may include an organic solvent such that the concentration of the total solids of the components contained becomes 1% by weight to 50% by weight, or 2% by weight to 20% by weight.

The hard coating layer can be used without particular limitation as long as it is a material known to be usable for the antireflection film.

Specifically, the preparation method of the antireflection film may further include the steps of coating a polymer resin composition for forming a hard coating layer including a photocurable compound or a (co)polymer thereof, and the like, on the substrate and photocuring the coated product. The hard coating layer can be formed by said steps.

The components used for forming the hard coating layer are the same as those described above with respect to the antireflection film of one embodiment.

The resin composition for forming the hard coating layer may further include at least one compound selected from the group consisting of an alkoxysilane-based oligomer and a metal alkoxide-based oligomer.

The method and apparatus commonly used for coating the resin composition for forming the hard coating layer can be used without particular limitation. For example, a bar coating method, such as one using a Mayer bar or the like, a gravure coating method, a 2-roll reverse coating method, a vacuum slot die coating method, a 2-roll coating method, or the like can be used.

In the step of photocuring the polymer resin composition for forming the hard coating layer, ultraviolet light or visible light having a wavelength of 200 nm to 400 nm can be irradiated, and the amount of exposure is preferably 100 mJ/cm$^2$ to 4000 mJ/cm$^2$.

The exposure time is not particularly limited, and can be appropriately varied depending on the exposure apparatus used, the wavelength of the irradiated light, or the amount of exposure.

Further, in the step of photocuring the photocurable coating composition for forming the hard coating layer, nitrogen purging or the like may be performed.

Advantageous Effects

According to the present invention, an anti-reflective film capable of realizing high scratch resistance and antifouling property while having low reflectance and high light transmittance, and further capable of enhancing screen sharpness of a display device, and a method for preparing said anti-reflective film, can be provided.

BRIEF DESCRIPTION OF THE DRAWINGS

FIG. 1 shows a graph of friction force measurement of the anti-reflective film of Example 1.

FIG. 2 shows a graph of friction force measurement of the anti-reflective film of Example 2.

FIG. 3 shows a graph of friction force measurement of the anti-reflective film of Example 3.

FIG. 4 shows a graph of friction force measurement of the anti-reflective film of Example 4.

FIG. 5 shows a graph of friction force measurement of the anti-reflective film of Example 5.

FIG. 6 shows a graph of friction force measurement of the anti-reflective film of Comparative Example 1.

FIG. 7 shows a graph of friction force measurement of the anti-reflective film of Comparative Example 2.

FIG. 8 shows a graph of friction force measurement of the anti-reflective film of Comparative Example 3.

DETAILED DESCRIPTION

The present invention will be described in more detail by way of examples. However, the following examples are for illustrative purposes only and are not intended to limit the scope of the present invention thereto.

PREPARATION EXAMPLE

Preparation Example: Preparation of Hard Coating Layer

A salt type of antistatic hard coating solution (manufactured by KYOEISHA Chemical, solid content: 50 wt %, product name: LJD-1000) was coated onto a triacetyl cellulose film with a #10 Mayer bar, dried at 90° C. for 1 minute, and then irradiated with ultraviolet light of 150 mJ/cm$^2$ to prepare a hard coating film having a thickness of about 5 to 6 μm.

Examples 1 to 5: Preparation of Anti-Reflective Film

Example 1

(1) Preparation of a Photocurable Coating Composition for Preparing a Low Refractive Index Layer Based on 100 parts by weight of pentaerythritol triacrylate (PETA), 281 parts by weight of hollow silica nanoparticles (diameter range: about 44 nm to 61 nm, manufactured by JGC Catalyst and Chemicals), 63 parts by weight of solid silica nanoparticles (diameter range: about 12.7 nm to 17 nm), 131 parts by weight of a first fluorine-containing compound (X-71-1203M, Shin-Etsu Chemical), 19 parts by weight of a second fluorine-containing compound (RS-537, DIC Corporation), and 31 parts by weight of an initiator (Irgacure 127, Ciba) were diluted in MIBK (methyl isobutyl ketone) solvent so that the solid content concentration became 3 wt %.

(2) Preparation of Low Refractive Index Layer and Anti-Reflective Film

The photocurable coating composition obtained as described above was coated onto the hard coating film of the preparation example at a thickness of about 110 to 120 nm with a #4 Mayer bar, and dried and cured at the temperature and time shown in Table 1 below to form a low refractive index layer, thereby preparing an anti-refractive film.

At the time of curing, ultraviolet light of 252 mJ/cm$^2$ was irradiated to the dried coating under a nitrogen purge.

Then, the longest diameter of each of the hollow silica nanoparticles and the solid silica nanoparticles (particle number: 100 to 170) contained in the formed low refractive index layer was measured using a transmission electron microscope (TEM). This process was repeated ten times to determine the average particle diameter of the hollow silica nanoparticles and the solid type of silica nanoparticles [average diameter of hollow silica nanoparticles: 55.9 nm, average diameter of solid silica nanoparticles: 14.5 nm].

Example 2

(1) Preparation of a Photocurable Coating Composition for Preparing a Low Refractive Index Layer Based on 100 parts by weight of trimethylolpropane triacrylate (TMPTA), 283 parts by weight of hollow silica nanoparticles (diameter range: about 42 nm to 66 nm, manufactured by JGC Catalyst and Chemicals), 59 parts by weight of solid silica nanoparticles (diameter range: about 12 nm to 19 nm), 115 parts by weight of a first fluorine-containing compound (X-71-1203M, Shin-Etsu Chemical), 15.5 parts by weight of a second fluorine-containing compound (RS-537, DIC Corporation), and 10 parts by weight of an initiator (Irgacure 127, Ciba) were diluted in MIBK (methyl isobutyl ketone) solvent so that the solid content concentration became 3 wt %.

(2) Preparation of Low Refractive Index Layer and Anti-Reflective Film

The photocurable coating composition obtained as described above was coated onto the hard coating film of the preparation example at a thickness of about 110 to 120 nm with a #4 Mayer bar, and dried and cured at the temperature and time shown in Table 1 below to form a low refractive index layer, thereby preparing an anti-refractive film.

At the time of curing, ultraviolet light of 252 mJ/cm$^2$ was irradiated to the dried coating under a nitrogen purge.

Then, the longest diameter of each of the hollow silica nanoparticles and the solid silica nanoparticles (particle number: 100 to 170) contained in the formed low refractive index layer was measured using a transmission electron microscope (TEM). This process was repeated ten times to determine the average particle diameter of the hollow silica nanoparticles and the solid type of silica nanoparticles [average diameter of hollow silica nanoparticles: 54.9 nm, average diameter of solid silica nanoparticles: 14.5 nm].

Example 3

(1) Preparation of a Photocurable Coating Composition for Preparing a Low Refractive Index Layer Based on 100 parts by weight of pentaerythritol triacrylate (PETA), 281 parts by weight of hollow silica nanoparticles (diameter range: about 43 nm to 71 nm, manufactured by JGC Catalyst and Chemicals), 63 parts by weight of solid silica nanoparticles (diameter range: about 18 nm to 23 nm), 111 parts by weight of a first fluorine-containing compound (X-71-1203M, Shin-Etsu Chemical), 30 parts by weight of a second fluorine-containing compound (RS-537, DIC Corporation), and 23 parts by weight of an initiator (Irgacure 127, Ciba) were diluted in MIBK (methyl isobutyl ketone) solvent so that the solid content concentration became 3 wt %.

(2) Preparation of Low Refractive Index Layer and Anti-Reflective Film

The photocurable coating composition obtained as described above was coated onto the hard coating film of Preparation Example 1 at a thickness of about 110 to 120 nm with a #4 Mayer bar, and dried and cured at the temperature and time shown in Table 1 below to form a low refractive index layer, thereby preparing an anti-refractive film.

At the time of curing, ultraviolet light of 252 mJ/cm$^2$ was irradiated to the dried coating under a nitrogen purge.

Then, the longest diameter of each of the hollow silica nanoparticles and the solid silica nanoparticles (particle number: 100 to 170) contained in the formed low refractive index layer was measured using a transmission electron microscope (TEM). This process was repeated ten times to determine the average particle diameter of the hollow silica nanoparticles and the solid type of silica nanoparticles [average diameter of hollow silica nanoparticles: 54.5 nm, average diameter of solid silica nanoparticles: 19.5 nm].

Example 4

(1) Preparation of a Photocurable Coating Composition for Preparing a Low Refractive Index Layer Based on 100 parts by weight of trimethylolpropane triacrylate (TMPTA), 264 parts by weight of hollow silica nanoparticles (diameter range: about 38 nm to 82 nm, manufactured by JGC Catalyst and Chemicals), 60 parts by weight of solid silica nanoparticles (diameter range: about 15 nm to 19 nm), 100 parts by weight of a first fluorine-containing compound (X-71-1203M, Shin-Etsu Chemical), 50 parts by weight of a second fluorine-containing compound (RS-537, DIC Corporation), and 30 parts by weight of an initiator (Irgacure 127, Ciba) were diluted in MIBK (methyl isobutyl ketone) solvent so that the solid content concentration became 3 wt %.

(2) Preparation of Low Refractive Index Layer and Anti-Reflective Film

The photocurable coating composition obtained as described above was coated onto the hard coating film of the preparation example at a thickness of about 110 to 120 nm with a #4 Mayer bar, and dried and cured at the temperature and time shown in Table 1 below to form a low refractive index layer, thereby preparing an anti-refractive film.

At the time of curing, ultraviolet light of 252 mJ/cm$^2$ was irradiated to the dried coating under a nitrogen purge.

Then, the longest diameter of each of the hollow silica nanoparticles and the solid silica nanoparticles (particle number: 100 to 170) contained in the formed low refractive index layer was measured using a transmission electron microscope (TEM). This process was repeated ten times to determine the average particle diameter of the hollow silica nanoparticles and the solid type of silica nanoparticles [average diameter of hollow silica nanoparticles: 55.4 nm, average diameter of solid silica nanoparticles: 17.1 nm].

Example 5

(1) Preparation of Hard Coating Layer (HD2)

30 g of pentaerythritol triacrylate, 2.5 g of a high molecular weight copolymer (BEAMSET 371, Arakawa Chemical Industries, Ltd., Epoxy Acrylate, molecular weight 40,000), 20 g of methyl ethyl ketone, and 0.5 g of a leveling agent (Tego wet 270) were homogeneously mixed, and then 2 g of acrylic-styrene copolymer with a refractive index of 1.525 (volume average particle diameter: 2 μm, manufacturer: Sekisui Plastic) was added thereto to prepare a hard coating composition.

The hard coating composition thus obtained was coated onto a triacetyl cellulose film with a #10 Mayer bar, and dried at 90° C. for 1 minute. Ultraviolet rays of 150 mJ/cm$^2$ were irradiated onto the dried product to prepare a hard coating film having a thickness of 5 μm.

(2) Preparation of Low Refractive Index Layer and Anti-Reflective Film

Based on 100 parts by weight of trimethylolpropane triacrylate (TMPTA), 283 parts by weight of hollow silica nanoparticles (diameter range: about 40 nm to 68 nm, manufactured by JGC Catalyst and Chemicals), 59 parts by weight of solid silica nanoparticles (diameter range: about 14 nm to 17 nm), 115 parts by weight of a first fluorine-containing compound (X-71-1203M, Shin-Etsu Chemical), 15.5 parts by weight of a second fluorine-containing compound (RS-537, DIC Corporation), and 10 parts by weight of an initiator (Irgacure 127, Ciba) were diluted in MIBK (methyl isobutyl ketone) solvent so that the solid content concentration became 3 wt %. Thereby, a photocurable coating composition for preparing a low refractive index layer was prepared.

The photocurable coating composition thus obtained was coated onto the above-prepared hard coating layer (HD2) at a thickness of about 110 to 120 nm with a #4 Mayer bar, and dried and cured at the temperature and time shown in Table 1 below to form a low refractive index layer, thereby preparing an anti-refractive film.

At the time of curing, ultraviolet light of 252 mJ/cm$^2$ was irradiated to the dried coating under a nitrogen purge.

Then, the longest diameter of each of the hollow silica nanoparticles and the solid silica nanoparticles (particle number: 100 to 170) contained in the formed low refractive index layer was measured using a transmission electron microscope (TEM). This process was repeated ten times to determine the average particle diameter of the hollow silica nanoparticles and the solid type of silica nanoparticles [average diameter of hollow silica nanoparticles: 55.4 nm, average diameter of solid silica nanoparticles: 14.7 nm].

TABLE 1

|  | Drying temperature (° C.) | Drying time |
|---|---|---|
| Example 1 | 40 | 1 min |
| Example 2 | 60 | 1 min |
| Example 3 | 80 | 1 min |
| Example 4 | 60 | 2 min |
| Example 5 | 60 | 1 min |

COMPARATIVE EXAMPLE: PREPARATION OF ANTI-REFLECTIVE FILM

Comparative Example 1

An anti-reflective film was prepared in the same manner as in Example 1, except that the solid silica nanoparticles were not used.

The longest diameter of the hollow silica nanoparticles (particle number: 100 to 170) contained in the formed low refractive index layer was measured using a transmission electron microscope (TEM). This process was repeated ten times to determine the average particle diameter of the hollow silica nanoparticles [average diameter of hollow silica nanoparticles: 54.9 nm].

Comparative Example 2

An anti-reflective film was prepared in the same manner as in Example 1, except that the solid silica nanoparticles (diameter range: about 38 nm to 67 nm) were used.

The longest diameter of each of the hollow silica nanoparticles and the solid silica nanoparticles (particle number: 100 to 170) contained in the formed low refractive index layer was measured using a transmission electron microscope (TEM). This process was repeated ten times to determine the average particle diameter of the hollow silica nanoparticles and the solid silica nanoparticles [average diameter of hollow silica nanoparticles: 54 nm, average diameter of solid silica nanoparticles: 50 nm].

Comparative Example 3

An anti-reflective film was prepared in the same manner as in Example 3, except that the solid silica nanoparticles (diameter range: about 90 nm to 127 nm) were used.

The longest diameter of the hollow silica nanoparticles (particle number: 100 to 170) contained in the formed low refractive index layer was measured using a transmission electron microscope (TEM). This process was repeated ten times to determine the average particle diameter of the hollow silica nanoparticles and the solid silica nanoparticles [average diameter of hollow silica nanoparticles: 54 nm, average diameter of solid silica nanoparticles: 110 nm].

Experimental Example: Measurement of Physical Properties of Anti-Reflective Films The following experiments were conducted for the anti-reflective films obtained in the examples and comparative examples.

1. Measurement of Reflectivity of Anti-Reflective Film

The average reflectance of the anti-reflective films obtained in the examples and comparative examples showing in a visible light region (380 to 780 nm) was measured using a Solidspec 3700 (SHIMADZU) apparatus.

2. Measurement of Antifouling Property

A straight line having a length of 5 cm was drawn with a black marker on the surface of the anti-reflective films obtained in the examples and comparative examples. Then, the antifouling property was measured by confirming the number of times of erasing when rubbed with a poly wiper.

<Measurement Standard>

○: Erased when rubbing 10 times or less

Δ: Erased when rubbing 11 to 20 times

X: Erased when rubbing 20 times or more, or not erased

3. Measurement of Scratch Resistance

The surfaces of the antireflection films obtained in the examples and comparative examples were rubbed while applying a load to steel wool and reciprocating ten times at a speed of 27 rpm.

A maximum load at which the number of scratches (1 cm or less) observed by the naked eye was 1 or less was measured.

4. Measurement of Friction and Maximum and Maximum Amplitude (A)

The TAC film was placed on the surfaces of the anti-reflective films obtained in the examples and comparative examples, and the friction force was measured on a test distance of 10 cm in total at a test speed of 18 cm/min under a load of 400 g to obtain a graph corresponding thereto.

Specifically, the graph of the friction force measurement was obtained by bringing a TAC film into contact with a surface of the anti-reflective film using a Friction Tester (FP-2260, manufactured by Thwing-Albert Instrument Company), placing a sled with a load of 400 g thereon, and then measuring the friction force while pulling the sled at a test speed of 18 cm/min by a test distance of 10 cm in total.

Subsequently, the dynamic friction force, the maximum friction force, and the minimum friction force were determined from the obtained graph of the friction force measurement, and then the maximum value of the absolute values of the difference between the average friction force and the maximum friction force or the minimum friction force was defined as the maximum amplitude (A).

At this time, the static test distance is a section up to 3 cm in the test distance, and the dynamic test distance corresponds to a section from 3 cm to 10 cm in the test distance.

5. Measurement of Refractive Index and Cauchy Parameter of Low Refractive Index Layer After confirming by a transmission electron microscope that a first layer in which solid inorganic nanoparticles are mainly distributed close to the interface between the hard coating layer and the low refractive index layer, and a second layer in which the hollow inorganic nanoparticles are mainly distributed on the opposite side of the interface, are present in the low refractive index layers of the anti-refractive films obtained in the examples and comparative examples, Cauchy parameters A, B, and C were measured for each of the first layer and the second layer by fitting the polarization ellipticity measured by an ellipsometry method to a Cauchy model. Based on such measurement, the refractive index at a wavelength of 550 nm was calculated according to the General Formula 1 described above.

TABLE 2

| | Example 1 | Example 2 | Example 3 | Example 4 | Example 5 | Comparative Example 1 | Comparative Example 2 | Comparative Example 3 |
|---|---|---|---|---|---|---|---|---|
| Ratio of average diameter[1] | 0.26 | 0.26 | 0.36 | 0.31 | 0.27 | — | 0.93 | 2.04 |
| Maximum amplitude (N) | 0.02 | 0.01 | 0.02 | 0.03 | 0.04 | 0.35 | 0.12 | 0.85 |
| Average reflectance (%) | 0.63 | 0.62 | 0.67 | 0.64 | 0.67 | 1.0 | 1.1 | 1.1 |
| Scratch resistance (g) | 500 | 500 | 500 | 500 | 500 | 50 | 50 | 50 |
| Antifouling property | ○ | ○ | ○ | ○ | ○ | X | X | X |
| Phase-separation | ○ | ○ | ○ | ○ | ○ | X | X | X |
| First layer  A | 1.502 | 1.505 | 1.498 | 1.491 | 1.505 | 1.35 | 1.38 | 1.38 |
| First layer  B | 0.00351 | 0.00464 | 0.00311 | 0.00573 | 0.00316 | 0.0001 | 0.0003 | 0.05 |
| First layer  C | $4.1280 \times 10^{-4}$ | $3.4882 \times 10^{-4}$ | $4.1352 \times 10^{-4}$ | $3.9821 \times 10^{-4}$ | 0 | 0.0045 | 0.0015 | 0.011 |
| Second layer  A | 1.35 | 1.349 | 1.321 | 1.346 | 1.375 | 1.35 | 1.38 | 1.38 |
| Second layer  B | 0.00513 | 0.00304 | 0.00312 | 0 | 0.00178 | 0.0002 | 0.0004 | 0.02 |
| Second layer  C | $2.5364 \times 10^{-4}$ | 0 | $4.1280 \times 10^{-4}$ | $4.8685 \times 10^{-4}$ | $1.2131 \times 10^{-4}$ | 0.0009 | 0.0007 | 0.053 |

[1]Ratio of the average particle diameter of the solid inorganic nanoparticles relative to the average particle diameter of the hollow inorganic nanoparticles

TABLE 3

| | Example 1 | Example 2 | Example 3 | Example 4 | Example 5 | Comparative Example 1 | Comparative Example 2 | Comparative Example 3 |
|---|---|---|---|---|---|---|---|---|
| Refractive index of first layer | 1.502 | 1.505 | 1.498 | 1.491 | 1.505 | 1.35 | 1.38 | 1.38 |
| Refractive index of second layer | 1.35 | 1.349 | 1.321 | 1.346 | 1.375 | 1.35 | 1.38 | 1.38 |

As shown in Table 2, it is confirmed that in the anti-reflective films of Examples 1 to 5, in which the ratio of the particle diameters of the solid inorganic nanoparticles to the particle diameter of the hollow inorganic nanoparticles contained in the low refractive index layer is 0.55 or less, the maximum amplitude (A) is equal to or less than 0.1 N based on the average friction force.

Specifically, referring to FIG. 1, it is confirmed that the anti-reflective film of Example 1 does not substantially show a difference between the maximum friction force and the minimum friction force in the section from 3 to 10 cm, which is the kinetic test distance, as compared with the average friction force, and thus the slip property of the surface is excellent.

As shown in Table 3, it is also confirmed that the low refractive index layers of the anti-reflective films of Examples 1 to 6 have a first layer and a second layer having different refractive indexes, so that the hollow inorganic nanoparticles and the solid inorganic nanoparticles are phase separated.

In view of the fact that the refractive index of the first layer is higher than that of the second layer, it can be seen that the solid inorganic nanoparticles are mainly distributed in the first layer and the hollow inorganic nanoparticles are mainly distributed in the second layer. Therefore, it is confirmed that the solid inorganic nanoparticles are mostly present and gathered toward the interface between the hard coating layer and the low refractive index layer of the anti-reflective film, and the hollow inorganic nanoparticles are mostly present and gathered on the side far from the hard coat layer.

Accordingly, as shown in Table 2, it is confirmed that the anti-reflective films of the examples having the maximum amplitude (A) equal to or less than a specific value can simultaneously realize the high scratch resistance and antifouling property while exhibiting low reflectance of 0.70% or less in the visible light region.

On the other hand, as shown in Table 2, it is confirmed that in the anti-refractive films of Comparative Examples 1 to 3 in which the solid inorganic nanoparticles are not contained in the low refractive layer or the ratio of the particle diameter of the solid inorganic nanoparticles to the particle diameter of the hollow inorganic nanoparticles exceeds 0.55, the maximum amplitude (A) exceeds 0.1 N based on the average friction force.

Specifically, referring to FIGS. 6 to 8, it is confirmed that in the anti-reflective films of the comparative examples, the variation width of the friction force is large in the section from 3 cm to 10 cm which is the kinetic test distance and the maximum amplitude (A) has a considerable difference relative to the average friction force, and thus the slip property is not good.

In addition, as shown in Table 3, it is confirmed that in the low refractive index layer of the anti-reflective films of Comparative Examples 1 to 3, the refractive indexes of the first layer and the second layer are the same so that the hollow inorganic nanoparticles and the solid inorganic nanoparticles are mixed without being phase separated.

Thereby, as shown in Table 2, it is confirmed that the anti-reflective films of Comparative Examples 1 to 3 exhibit relatively high reflectance as well as low scratch resistance and antifouling properties, as compared with the anti-reflective films of Examples 1 to 5.

What is claimed is:

1. An anti-reflective film comprising: a hard coating layer; and a low refractive index layer including a binder resin, and hollow inorganic nanoparticles and solid inorganic nanoparticles which are dispersed in the binder resin,
    wherein the low refractive index layer includes the hollow inorganic nanoparticles in a higher amount by weight than the solid inorganic nanoparticles,
    wherein a ratio of an average particle diameter of the solid inorganic nanoparticles to an average particle diameter of the hollow inorganic nanoparticles is 0.26 to 0.55,
    the average particle diameter of the hollow inorganic nanoparticles is in a range of 40 nm to 100 nm,
    wherein the low refractive index layer comprises a first layer containing at least 70% by volume of the total volume of solid inorganic nanoparticles and a second layer containing at least 70% by volume of the total volume of hollow inorganic nanoparticles,
    wherein the first layer is positioned to be closer to an interface between the hard coating layer and the low refractive index layer, compared to the second layer,
    wherein the first layer has a refractive index of 1.420 to 1.600, and
    wherein the anti-reflective film exhibits average reflectance of 0.7% or less in the visible light wavelength region of 380 nm to 780 nm.

2. The anti-reflective film of claim 1, wherein the hollow inorganic nanoparticles have particle diameters in a range of 10 nm to 200 nm.

3. The anti-reflective film of claim 1, wherein the solid inorganic nanoparticles have particle diameters in a range of 0.1 nm to 100 nm and the average particle diameter of the solid inorganic nanoparticles is in a range of 14.5 nm to 30 nm.

4. The anti-reflective film of claim 1, wherein
    each of the solid inorganic nanoparticles and the hollow inorganic nanoparticles contains one or more reactive functional groups selected from the group consisting of a hydroxyl group, a (meth)acrylate group, an epoxide group, a vinyl group, and a thiol group on the surface thereof.

5. The anti-reflective film of claim 1, wherein
    the binder resin contained in the low refractive index layer includes a crosslinked (co)polymer between a first compound of a (co)polymer of a photopolymerizable compound and a second compound of a fluorine-containing compound containing a photoreactive functional group, the first compound and the second compound are different from each other.

6. The anti-reflective film of claim 5, wherein
    the low refractive index layer includes 10 to 400 parts by weight of the hollow inorganic nanoparticles and 10 to 400 parts by weight of the solid inorganic nanoparticles, relative to 100 parts by weight of the (co)polymer of the photopolymerizable compound.

7. The anti-reflective film of claim 1, wherein
    the low refractive index layer further includes a silane-based compound containing at least one reactive functional group selected from the group consisting of a vinyl group and a (meth)acrylate group.

8. The anti-reflective film of claim 7, wherein
    the silane-based compound containing at least one reactive functional group selected from the group consisting of the vinyl group and the (meth)acrylate group contains the reactive functional group with an equivalent weight of 100 to 1000 g/mol.

9. The anti-reflective film of claim 7, wherein
    the silane-based compound containing at least one reactive functional group selected from the group consisting of the vinyl group and the (meth) acrylate group has a weight average molecular weight of 100 to 5000.

10. The anti-reflective film of claim 1, wherein
    the hard coating layer includes a binder resin containing a photocurable resin and organic or inorganic fine particles dispersed in the binder resin.

11. The anti-reflective film of claim 10, wherein
    the organic fine particles have a particle diameter of 1 to 10 μm, and
    the inorganic fine particles have a particle diameter of 1 nm to 500 nm.

12. The anti-reflective film of claim 1, wherein the solid inorganic nanoparticles have a density higher by 0.50 g/cm$^3$ or more compared to the hollow inorganic nanoparticles.

13. The anti-reflective film of claim 12, wherein the hollow inorganic nanoparticles are hollow silica nanoparticles and the solid inorganic nanoparticles are solid silica nanoparticles.

14. The anti-reflective film of claim 1, wherein the hollow inorganic nanoparticles are hollow silica nanoparticles and the solid inorganic nanoparticles are solid silica nanoparticles.

15. The anti-reflective film of claim 1, wherein the ratio of an average particle diameter of the solid inorganic nanoparticles to an average particle diameter of the hollow inorganic nanoparticles is 0.26 to 0.35.

* * * * *